(12) United States Patent
Suzuki

(10) Patent No.: US 12,216,593 B2
(45) Date of Patent: Feb. 4, 2025

(54) MEMORY SYSTEM, METHOD, AND CONTROL CIRCUIT

(71) Applicant: Kioxia Corporation, Tokyo (JP)

(72) Inventor: Tomoaki Suzuki, Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/335,420

(22) Filed: Jun. 15, 2023

(65) Prior Publication Data

US 2024/0095193 A1 Mar. 21, 2024

(30) Foreign Application Priority Data

Sep. 21, 2022 (JP) ................................. 2022-150657

(51) Int. Cl.
*G06F 13/16* (2006.01)

(52) U.S. Cl.
CPC ...... *G06F 13/1626* (2013.01); *G06F 13/1668* (2013.01)

(58) Field of Classification Search
CPC .......................... G06F 13/1626; G06F 13/1668
See application file for complete search history.

(56) References Cited

U.S. PATENT DOCUMENTS

| | | | |
|---|---|---|---|
| 8,504,789 B2 | 8/2013 | Pyeon et al. | |
| 9,996,483 B2 | 6/2018 | Pitigoi-Aron | |
| 2007/0008797 A1* | 1/2007 | Park | G11C 7/109 365/219 |
| 2013/0151683 A1* | 6/2013 | Jain | G06F 3/0611 709/223 |
| 2022/0083479 A1 | 3/2022 | Suzuki | |
| 2022/0171570 A1* | 6/2022 | Kim | G06F 3/0659 |
| 2022/0358072 A1* | 11/2022 | Vergis | G06F 13/4068 |
| 2024/0103763 A1* | 3/2024 | Islam | G06F 3/0611 |

FOREIGN PATENT DOCUMENTS

| | | | |
|---|---|---|---|
| JP | 2012531635 A | 12/2012 | |
| JP | 2018513635 A | 5/2018 | |
| JP | 2022049552 A | 3/2022 | |

* cited by examiner

*Primary Examiner* — Sean D Rossiter
(74) *Attorney, Agent, or Firm* — Maier & Maier, PLLC

(57) ABSTRACT

According to one embodiment, a semiconductor memory device includes a first circuit, multiple second circuits, and a first number of first channels connected to the first circuit. One or more second circuits are connected to each first channel. The control circuit is connected to the semiconductor memory device via a second channel. The control circuit generates multiple first access requests each for one of the second circuits. The control circuit determines order of execution of the first access requests to allow concurrent execution of a second number of first access requests designating two or more of the second circuits connected to different first channels. The control circuit executes in parallel the second number of data transfers responsive to the second number of first access requests via the second channel at a transfer rate the second number of times a transfer rate of one of the first number of first channels.

15 Claims, 15 Drawing Sheets

MEMORY SYSTEM, METHOD, AND CONTROL CIRCUIT

CROSS-REFERENCE TO RELATED APPLICATIONS

This application is based upon and claims the benefit of priority from Japanese Patent Application No. 2022-150657, filed on Sep. 21, 2022; the entire contents of which are incorporated herein by reference.

FIELD

Embodiments described herein relate generally to a memory system, a method, and a control circuit.

BACKGROUND

A memory system including multiple memory chips, a memory controller, and a bridge chip located between the memory chips and the memory controller is available. The memory controller represents a control circuit that controls each of the memory chips via the bridge chip. The memory chips are individually connected to the bridge chip via one of multiple channels.

DETAILED DESCRIPTION

According to an embodiment, in general, a memory system includes a semiconductor memory device and a control circuit. The semiconductor memory device includes a first circuit, a plurality of second circuits, and a first number of first channels connected to the first circuit. The first number is two or more. One or more of the plurality of second circuits are connected to each of the first number of first channels. The control circuit is connected to the semiconductor memory device via a second channel. The control circuit generates a plurality of first access requests. Each of the first access requests is for requesting a data transfer with a designation of one of the plurality of second circuits as an access target. The control circuit then determines an order of execution of the plurality of first access requests to allow concurrent execution of a second number of first access requests designating as access targets two or more of the plurality of second circuits connected to different first channels of the first number of first channels. The second number is an integer equal to or greater than 1 and equal to or less than the first number. The control circuit executes in parallel the second number of data transfers responsive to the second number of first access requests via the second channel at a transfer rate the second number of times higher than a transfer rate of one of the first number of first channels.

Hereinafter, memory systems, methods, and control circuits according to some embodiments will be explained in detail with reference to the accompanying drawings. The following embodiments are presented for illustrative purposes only and unintended to limit the scope of the present invention.

First Embodiment

Figure 1:
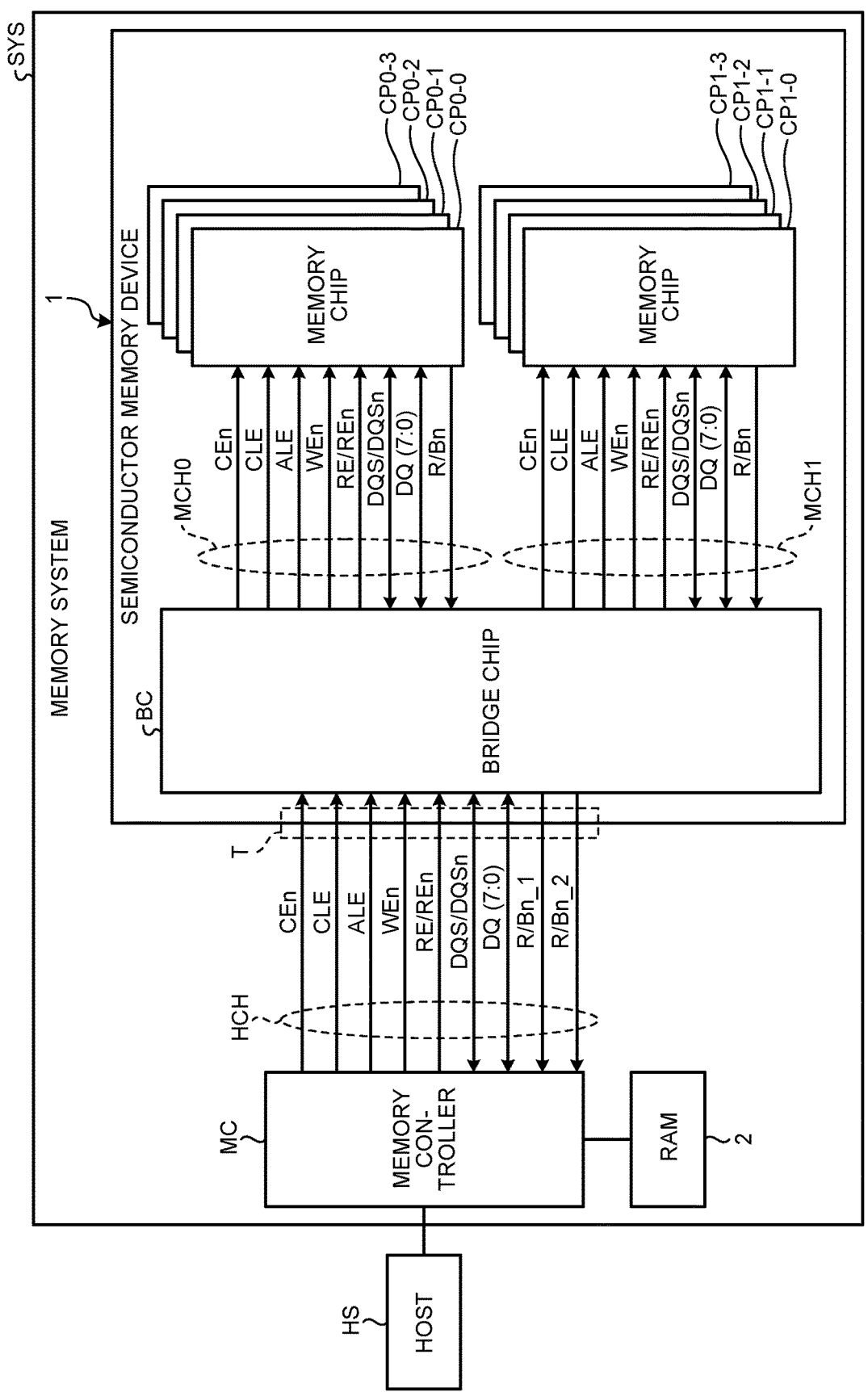
FIG. 1 is a schematic diagram illustrating an example of a configuration of a memory system according to a first embodiment.

FIG. 1 is a schematic diagram illustrating an exemplary configuration of a memory system SYS according to a first embodiment.

The memory system SYS is connectable to a host HS. The standard with which the communication path connecting the host HS and the memory system SYS and their mutual communications via the communication path are in compliance is not limited to a particular standard. The host HS is, for example, a personal computer, a personal digital assistant, or a server. To access the memory system SYS, the host HS transmits an access command to the memory system SYS. The access command includes a write command and a read command.

The memory system SYS includes a semiconductor memory device 1, a memory controller MC, and a random access memory (RAM) 2.

The memory controller MC is a control circuit that controls the semiconductor memory device 1. As part of the control over the semiconductor memory device 1, the memory controller MC performs data transfer between the host HS and the semiconductor memory device 1 in response to an access command from the host HS.

The RAM 2 provides the memory controller MC with various functions such as a buffer area, a cache area, and a program loading area. For example, the memory controller MC can buffer transfer data between the host HS and the semiconductor memory device 1 in the RAM 2. The memory controller MC also loads a firmware program into the RAM 2 for use, or buffers or caches various kinds of management data in the RAM 2.

The semiconductor memory device 1 includes an external terminal group T, a bridge chip BC, and a plurality of memory chips CP0-0 to CP0-3 and CP1-0 to CP1-3. The memory chips CP0-0 to CP0-3 and CP1-0 to CP1-3 are, for example, nonvolatile memory chips such as NAND flash memory. Herein, the memory chips CP0-0 to CP0-3 and CP1-0 to CP1-3 are defined to be NAND flash memory chips.

The semiconductor memory device 1 may be implemented as a multi-chip package (MCP) in which the memory chips CP0-0 to CP0-3 and the memory chips CP1-0 to CP1-3 are stacked on the top of one another. In a case of implementing the semiconductor memory device 1 as an MCP, the periphery of the bridge chip BC and the memory chips CP0-0 to CP0-3 and CP1-0 to CP1-3 may be sealed with a molding resin in the semiconductor memory device 1.

The semiconductor memory device 1 also includes a plurality of channels connecting the memory chips CP0-0 to CP0-3 and CP1-0 to CP1-3 and the bridge chip BC. Each of the channels is referred to as a memory channel MCH since the channel connects NAND flash memory.

In the example of FIG. 1, the semiconductor memory device 1 includes a plurality of memory channels, i.e., memory channels MCH0 and MCH1. Four memory chips CP0-0 to CP0-3 are connected to the bridge chip BC via the memory channel MCH0, and four memory chips CP1-0 to CP1-3 are connected to the bridge chip BC via the memory channel MCH1.

Each memory channel MCH is configured in compliance with a predetermined standard. In a case of using NAND flash memories as the memory chips CP0-0 to CP0-3 and CP1-0 to CP1-3, the predetermined standard can be, for example, NAND Flash Interface.

The number of memory chips CP included in the semiconductor memory device 1 is not limited to eight. The number of memory channels MCH connecting the bridge chip BC and the memory chips CP is not limited to two.

The bridge chip BC is an exemplary first circuit. Each of the memory chips CP0-0 to CP0-3 and CP1-0 to CP1-3 is an exemplary second circuit. Each memory channel MCH is an exemplary first channel.

In the following, the memory chips CP0-0 to CP0-3 and CP1-0 to CP1-3 may be individually or collectively referred to as a memory chip CP. The memory chips CP0-0 to CP0-3 may be individually or collectively referred to as a memory chip CP0. The memory chips CP1-0 to CP1-3 may be individually or collectively referred to as a memory chip CP1.

The semiconductor memory device 1 is connected to the memory controller MC via one channel. This one channel is referred to as a host channel HCH since the channel is on the host side as viewed from the bridge chip BC.

The configuration of the host channel HCH is complied with a predetermined standard. In a case of using NAND flash memories as the memory chips CP, the predetermined standard is, for example, NAND Flash Interface.

The host channel HCH is an exemplary second channel.

The host channel HCH includes a signal line for transferring a chip enable signal CEn, a signal line for transferring a command latch signal CLE, a signal line for transferring an address latch signal ALE, a signal line for transferring a write enable signal WEn, signal lines for transferring a read enable signal RE/REn, signal lines for transferring a data strobe signal DQS/DQSn, signal lines for transferring a data signal DQ(7:0) having a predetermined bit width (8-bits herein, as an example), a signal line for transferring a ready-busy signal R/Bn_1, and a signal line for transferring a ready-busy signal R/Bn_2. The letter "n" attached to the end of the signal signs represents that the signals operate by negative logic. Whether the signals operate by negative logic or positive logic can be freely designed.

The chip enable signal CEn serves to place the memory chip being an access target in an enable state. The data strobe signal DQS/DQSn is for instructing a counterpart device to acquire data transmitted by the data signal DQ(7:0). The data strobe signal DQS/DQSn is a differential signal including a data strobe signal DQS and a data strobe signal DQSn. The command latch enable signal CLE indicates that the data signal DQ(7:0) is a command. The address latch enable signal ALE indicates that the data signal DQ(7:0) is an address. The write enable signal WEn is for instructing a counterpart device to acquire a command or an address transmitted by the data signal DQ(7:0). The read enable signal REn/RE is for instructing a counterpart device to output the data signal DQ(7:0). The read enable signal REn/RE is a differential signal including a read enable signal RE and a read enable signal REn. The ready/busy signal R/Bn_1 and the ready/busy signal R/Bn_2 indicate a ready state (Ry) or a busy state (By). In the ready state the memory chip CP waits for reception of a command. In the busy state the memory chip CP cannot execute a command upon receipt. The signal-line configuration of the host channel HCH for transferring the ready-busy signals R/Bn is not limited to this example. As an example, the host channel HCH may include one signal line for transferring one ready-busy signal R/Bn generated from the ready-busy signal R/Bn for the memory channel MCH0 and the ready-busy signal R/Bn for the memory channel MCH1 via wired OR connection.

The memory channels MCH0 and MCH1 can both transmit and receive the same signal group as the signal group of the host channel HCH. Specifically, the memory channels MCH0 and MCH1 each include a signal line for transferring the chip enable signal CEn, a signal line for transferring the command latch signal CLE, a signal line for transferring the address latch signal ALE, a signal line for transferring the write enable signal WEn, signal lines for transferring the read enable signal RE/REn, signal lines for transferring the data strobe signal DQS/DQSn, signal lines for transferring the data signal DQ(7:0), and a signal line for transferring the ready-busy signal R/Bn.

Figure 2:
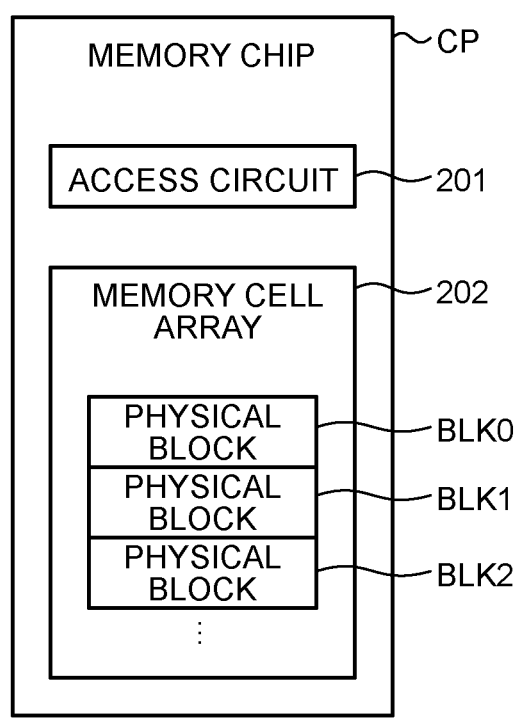
FIG. 2 is a diagram illustrating an exemplary configuration of a memory chip according to the first embodiment.

FIG. 2 is a diagram illustrating an exemplary configuration of the memory chip CP according to the first embodiment. The memory chip CP includes an access circuit 201 and a memory cell array 202.

The memory cell array 202 includes a plurality of physical blocks BLK (BLK0, BLK1, . . . ). Each physical block BLK is a set of nonvolatile memory cell transistors. Each physical block BLK includes a plurality of storage regions referred to as pages.

The access circuit 201 includes, for example, a row decoder, a column decoder, a sense amplifier, a latch circuit, and a voltage generator circuit. The access circuit 201 performs a data write operation, data read operation, or data erase operation to the memory cell array 202 in response to a receipt of an instruction from the memory controller MC via the bridge chip BC.

Specifically, the access circuit 201 can receive an input of data from the memory controller MC via the bridge chip BC on a page basis and write the input data into the memory cell array 202 on a page basis. The access circuit 201 can also read data from the memory cell array 202 on a page basis and output the read pages of data to the memory controller MC via the bridge chip BC on a cluster basis. The cluster refers to a set of data smaller in size than a page. The access circuit 201 can also perform data erase operation in the physical block BLK.

The access circuit 201 and the memory cell array 202 may be segmented into units of planes which are independently operable from each other.

Figure 3:
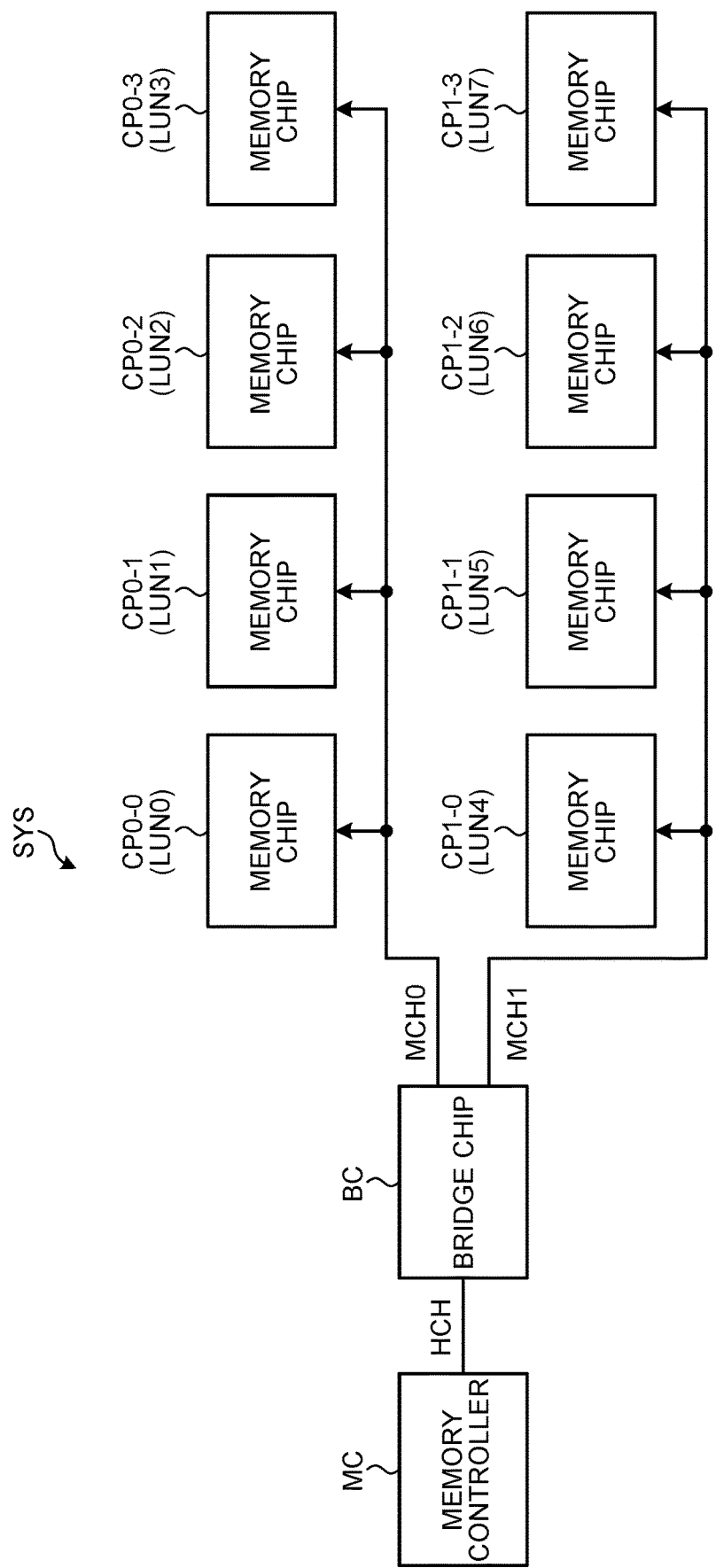
FIG. 3 is a schematic diagram for illustrating in detail the connection between a bridge chip and respective memory chips according to the first embodiment.

FIG. 3 is a schematic diagram for explaining in more detail the connection between the bridge chip BC and the respective memory chips CP according to the first embodiment.

As illustrated in FIG. 3, the four memory chips CP0-0 to CP0-3 are commonly connected to the memory channel MCH0. Similarly, the four memory chips CP1-0 to CP1-3 are commonly connected to the memory channel MCH1.

The memory chips CP0-0 to CP0-3 and CP1-0 to CP1-3 may not be commonly connected to all the respective signal lines constituting the corresponding memory channels MCH. The individual memory chips CP0-0 to CP0-3 and CP1-0 to CP1-3 may be connected to the bridge chip BC via some of the signal lines constituting the corresponding memory channels MCH on a one-to-one basis, except for the signal lines for transferring the data signal DQ(7:0).

Since the bridge chip BC and each memory chip CP are connected in the above-described manner, the bridge chip BC can perform a data transfer via the memory channel MCH0 and a data transfer via the memory channel MCH1 in parallel. The host channel HCH connecting the memory controller MC and the bridge chip BC is controlled so as to prevent transfer data from remaining in the bridge chip BC at a time of such parallel data transfers via the memory channel MCH0 and via the memory channel MCH1. Thus, the host channel HCH can transfer data at a transfer rate equal to a sum of the transfer rate of the memory channel MCH0 and the transfer rate of the memory channel MCH1. Specifically, in the example illustrated in FIG. 3, the host channel HCH can transfer data at a transfer rate twice the transfer rate of the memory channel MCH.

In order to increase the data transfer rate between the memory controller MC and the memory chip groups CP as much as possible, the memory controller MC accesses the four memory chips CP0-0 to CP0-3 and the four memory chips CP1-0 to CP1-3 such that the same size of data is transferred for the same type of access at the same transfer timing to any of the memory chips CP0-0 to CP0-3 and to any of the memory chips CP1-0 to CP1-3 to be accessed. The access type includes a read operation and a write operation.

For example, each memory chip CP is given a logical unit number (LUN) being a unique identification number in the semiconductor memory device 1. To implement the access control as above, the memory controller MC pre-stores the relationship between the logical unit numbers of the respective memory chips CP and the memory channels MCH to which the memory chips CP are connected. In the example illustrated in FIG. 3, the memory chips CP0-0, CP0-1, CP0-2, and CP0-3 are assigned with LUN0, LUN1, LUN2, and LUN3, respectively, and the memory chips CP1-0, CP1-1, CP1-2, and CP1-3 are assigned with LUN4, LUN5, LUN6, and LUN7, respectively. The memory controller MC stores in advance the relationship that the four memory chips CP (i.e., the memory chips CP0-1 to CP0-3) identified by LUN0 to LUN3 are connected to the memory channel MCH0, and the four memory chips CP (i.e., the memory chips CP1-1 to CP1-3) identified by LUN4 to LUN7 are connected to the memory channel MCH1.

Figure 4:
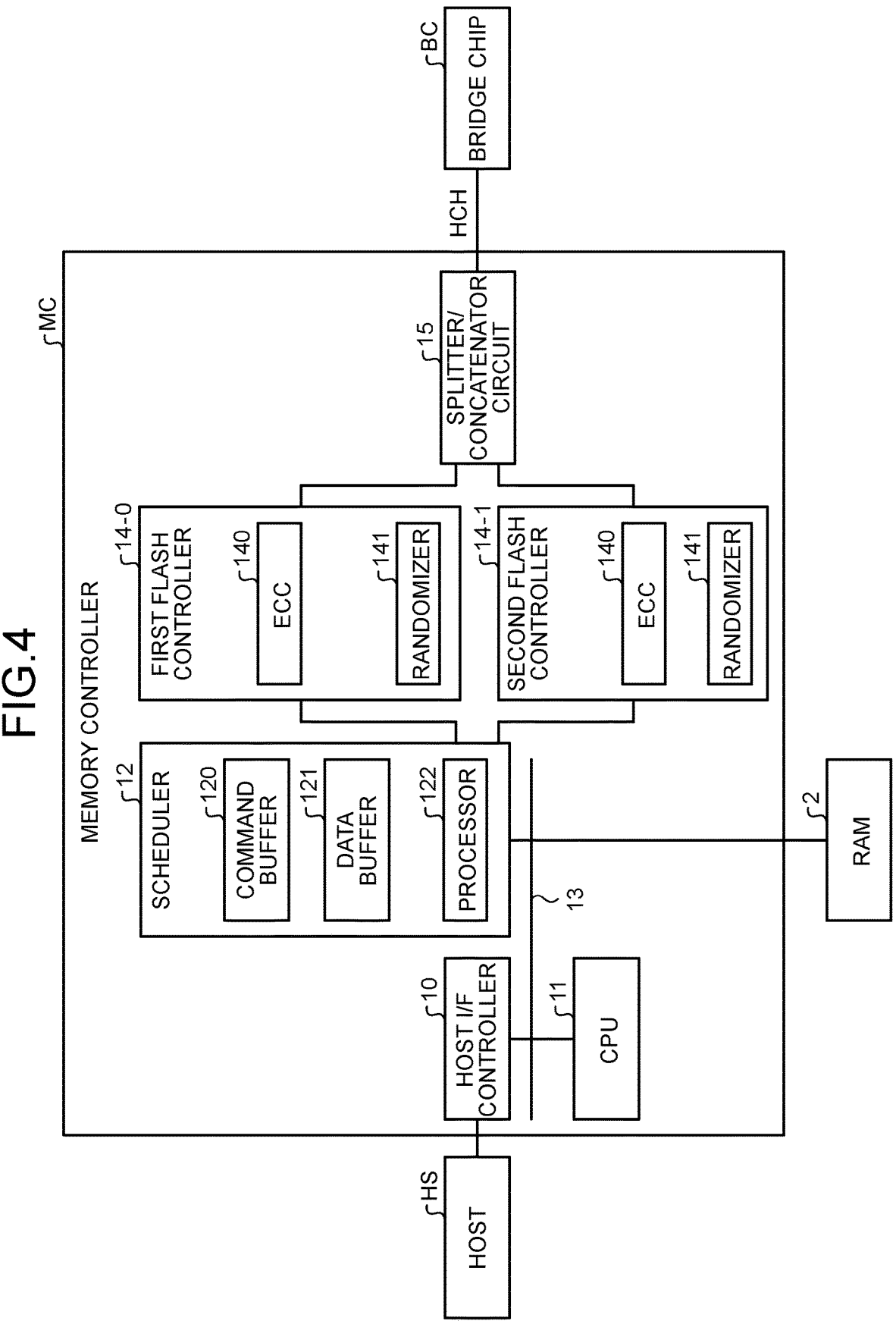
FIG. 4 is a diagram illustrating an example of a hardware configuration of a memory controller according to the first embodiment.

FIG. 4 is a diagram illustrating an example of a hardware configuration of the memory controller MC according to the first embodiment.

The memory controller MC includes a host interface (I/F) controller 10, a central processing unit (CPU) 11, a scheduler 12, a bus 13, a first flash controller 14-0, a second flash controller 14-1, and a splitter/concatenator circuit 15. The first flash controller 14-0 and the second flash controller 14-1 may be individually or collectively referred to as a flash controller 14.

The host OF controller 10, the CPU 11, the RAM 2, and the scheduler 12 are electrically connected to the bus 13.

As an example, the memory controller MC is configured as a system-on-a-chip (SoC). The memory controller MC may include a plurality of chips. The memory controller MC may be configured as a single SoC including the RAM 2.

The host OF controller 10 performs control of signal transfers with respect to the host HS. For example, the host OF controller 10 receives various kinds of commands from the host HS. The host OF controller 10 transfers data to the host HS.

The CPU 11 is a processor that performs control of the memory controller MC as a whole. The CPU 11 performs control of the memory controller MC by a firmware program. As part of the control, the CPU 11 identifies an access target in the semiconductor memory device 1 based on address information included in an access command from the host HS. The CPU 11 generates an access request for requesting an access to the identified access target. The CPU 11 also generates an access request in accordance with internal processing such as garbage collection (compaction). The access request includes address information indicating a location to be accessed, designation of an access type, and designation of a transfer-data size.

In response to the access request generated by the CPU 11, each flash controller 14 controls data transfer between the memory controller MC and the semiconductor memory device 1 with a designation of one memory chip CP as an access target. For the access type designated by the access request, each flash controller 14 transfers data of the size designated by the access request to the memory chip CP designated as the access target by the access request.

Each flash controller 14 also performs various types of error reduction processing to the transfer data. Examples of various types of error reduction processing include error correction coding, error correction, randomization, and inverse processing of randomization.

Specifically, each flash controller 14 includes an error correction code circuit (ECC) 140 and a randomizer 141.

The ECC 140 performs error correction coding to data to be transmitted to the semiconductor memory device 1 on a cluster basis. The ECC 140 also performs error correction to data received from the semiconductor memory device 1 on a cluster basis.

The randomizer 141 performs randomization to data to be transmitted to the semiconductor memory device 1 in order to equalize the occurrence frequencies between "0" and "1". The randomizer 141 restores the data received from the semiconductor memory device 1 to the one before the randomization by executing inverse processing of the randomization to the data.

The scheduler 12 includes a command buffer 120, a data buffer 121, and a processor 122. The command buffer 120 sequentially accepts access requests generated by the CPU 11. The data buffer 121 receives write data to be transmitted to the memory chip CP. When two or more access requests are accumulated in the command buffer 120, the processor 122 determines the order of execution of the two or more access requests to allow concurrent execution of a data transfer via the memory channel MCH0 and a data transfer via the memory channel MCH1. Specifically, the processor 122 sequentially acquires, from the command buffer 120, a pair of an access request including a designation of one of the four memory chips CP0-0 to CP0-3 as an access target and an access request including a designation of one of the four memory chips CP1-0 to CP1-3 as an access target. As an example, the processor 122 pairs two access requests including the same type of access and transfer-data size. The processor 122 concurrently inputs one of the access request pair to the first flash controller 14-0 and the other to the second flash controller 14-1.

The scheduler 12 associates the two memory channels MCH with the two flash controllers 14 on a one-to-one basis. The scheduler 12 inputs one of the access request pair to the flash controller 14 corresponding to the memory channel MCH connected to the memory chip CP designated as an access target by the access request. The scheduler 12 inputs the other of the access request pair to the flash controller 14 corresponding to the memory channel MCH connected to the memory chip CP designated as an access target by the access request.

Herein, the memory channel MCH0 is associated with the first flash controller 14-0 and the memory channel MCH1 is associated with the second flash controller 14-1, as an example. The association between the two memory channels MCH and the two flash controllers 14 may not be stationary. The association between the two memory channels MCH and the two flash controllers 14 may be dynamically changed.

In response to a concurrent input of a pair of access requests, the two flash controllers 14 concurrently start transferring data to the memory chips CP being access targets according to the access requests. Thus, the two flash controllers 14 execute data transfers responsive to the access requests in parallel.

There may be occurrence of an access request that cannot be paired with any of the access requests stored in the command buffer 120. Such an access request that cannot be paired with any of the access requests stored in the command buffer 120 is referred to as an unpaired access request. The processor 122 inputs an unpaired access request, if any, to the corresponding flash controller 14.

The splitter/concatenator circuit 15 is disposed between the two flash controllers 14 and the host channel HCH.

When receiving transfer data in parallel from the first flash controller 14-0 and the second flash controller 14-1, the splitter/concatenator circuit 15 concatenates the transfer data from the first flash controller 14-0 and the transfer data from the second flash controller 14-1 to transfer the concatenated transfer data to the bridge chip BC via the host channel HCH at a transfer rate twice higher than the transfer rate of the memory channel MCH.

When receiving a concatenation of output data from one of the four memory chips CP0-0 to CP0-3 and output data from one of the four memory chips CP1-0 to CP1-3 via the host channel HCH at a transfer rate twice higher than the transfer rate of the memory channel MCH, the splitter/concatenator circuit 15 splits the concatenated data into two. The splitter/concatenator circuit 15 then transfers one of the two pieces of split data to the first flash controller 14-0 and the other to the second flash controller 14-1 at the same transfer rate as the transfer rate of the memory channel MCH.

Some or all of the functions of the CPU 11 may be implemented by hardware circuitry such as a field-programmable gate array (FPGA) or an application specific integrated circuit (ASIC). Some or all of the functions of the scheduler 12 may be implemented by the CPU 11's executing a firmware program.

Figure 5:
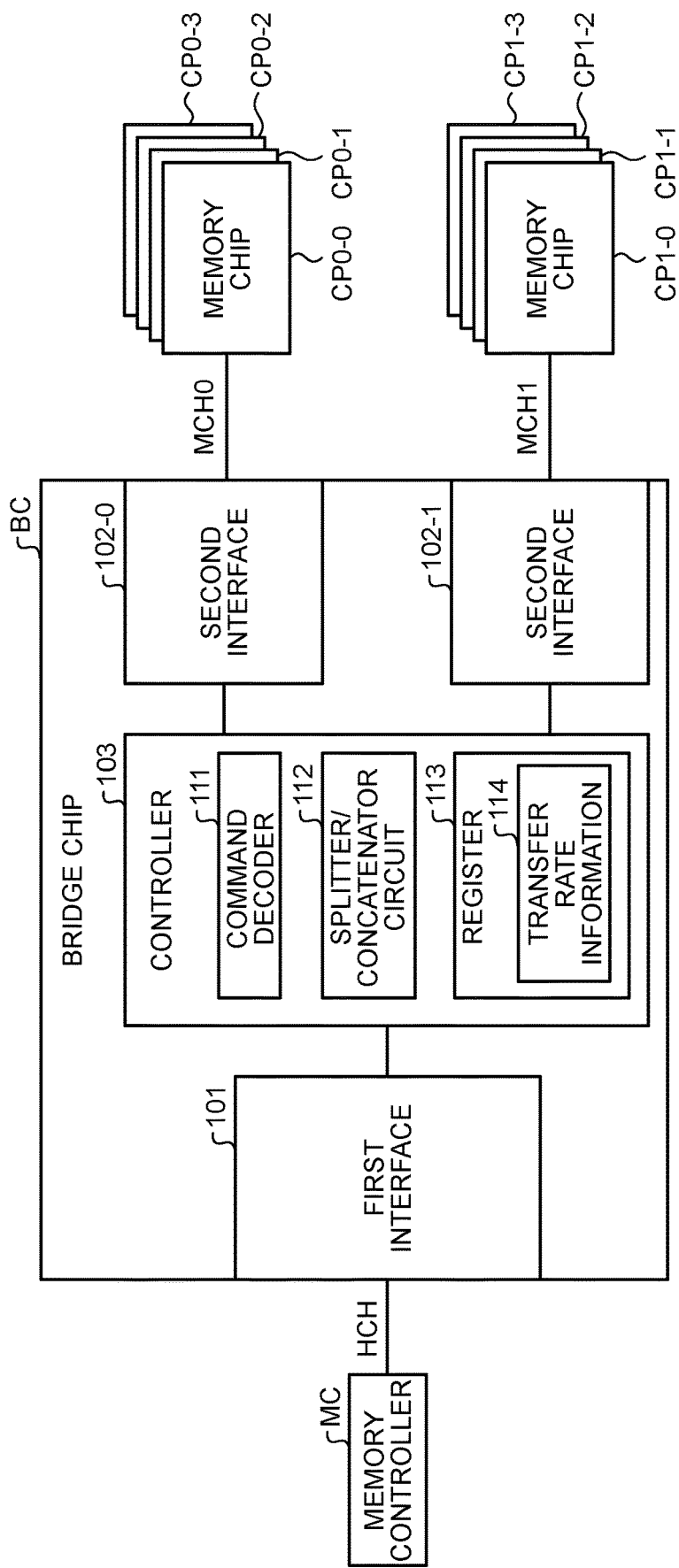
FIG. 5 is a diagram illustrating an example of a hardware configuration of the bridge chip according to the first embodiment.

FIG. 5 is a diagram illustrating an exemplary hardware configuration of the bridge chip BC according to the first embodiment.

The bridge chip BC includes a first interface 101, two second interfaces 102 (102-0 and 102-1), and a controller 103.

The first interface 101 is a PHY circuit that transmits and receives signals to and from the memory controller MC via the host channel HCH.

The second interface 102-0 of the two second interfaces 102 is a PHY circuit that transmits and receives signals to and from the four memory chips CP0-0 to CP0-3 via the memory channel MCH0. The second interface 102-1 of the two second interfaces 102 is a PHY circuit that transmits and receives signals to and from the four memory chips CP1-0 to CP1-3 via the memory channel MCH1.

The controller 103 is disposed between the first interface 101 and the two second interfaces 102. The controller 103 controls exchange of information between the first interface 101 and the two second interfaces 102.

The controller 103 includes a command decoder 111, a splitter/concatenator circuit 112, and a register 113.

The command decoder 111 receives and analyzes a command from the memory controller MC via the host channel HCH. The command decoder 111 can issue a command to the memory chip CP according to a result of the analysis.

The register 113 is a memory that stores various kinds of information for controlling the operation of the bridge chip BC. As an example, transfer-rate information 114 indicating the transfer rate of the host channel HCH may be set in the register 113.

For example, to allow the bridge chip BC to concurrently execute a data transfer via the memory channel MCH0 and a data transfer via the memory channel MCH1, the memory controller MC sets in the register 113 the transfer-rate information 114 including information indicating "x2". Thereby, the memory controller MC and the bridge chip BC can mutually transfer data via the host channel HCH at a transfer rate twice higher than the transfer rate of the memory channel MCH.

To allow the bridge chip BC execute one of the data transfers via the memory channel MCH0 and via the memory channel MCH1, the memory controller MC sets the transfer-rate information 114 including information indicating "x1" in the register 113. Thereby, the memory controller MC and the bridge chip BC can mutually transfer data via the host channel HCH at the same transfer rate as the transfer rate of the memory channel MCH.

To change the transfer rate of the host channel HCH, the memory controller MC transmits, to the bridge chip BC, a command for setting information in the register 113 of the bridge chip BC and new transfer-rate information 114 including information indicating a new transfer rate, for example. In the bridge chip BC, the command decoder 111 interprets the command and stores the new transfer-rate information 114 in the register 115 in an overwriting manner. The controller 103 sets the first interface 101 so as to allow execution of a data transfer at the transfer rate indicated by the new transfer-rate information 114.

The method of changing the transfer rate of the host channel HCH is not limited to the above example.

When concurrently receiving output data from one of the four memory chips CP0-0 to CP0-3 and output data from one of the four memory chips CP1-0 to CP1-3 from the two second interfaces 102, the splitter/concatenator circuit 112 concatenates the two pieces of data. The splitter/concatenator circuit 112 supplies the concatenated data to the first interface 101 at a transfer rate twice higher than the transfer rate of the memory channel MCH. The first interface 101 transmits the concatenated data to the memory controller MC via the host channel HCH at a transfer rate twice higher than the transfer rate of the memory channel MCH.

When receiving a concatenation of data addressed to one of the four memory chips CP0-0 to CP0-3 and data addressed to one of the four memory chips CP1-0 to CP1-3 at a transfer rate twice higher than the transfer rate of the memory channel MCH via the host channel HCH and the first interface 101, the splitter/concatenator circuit 112 splits the concatenated data into two. The splitter/concatenator circuit 15 then transfers one of the two pieces of split data to the second interface 102-0 and the other to the second interface 102-1 at the same transfer rate as the transfer rate of the memory channel MCH.

Figure 6:
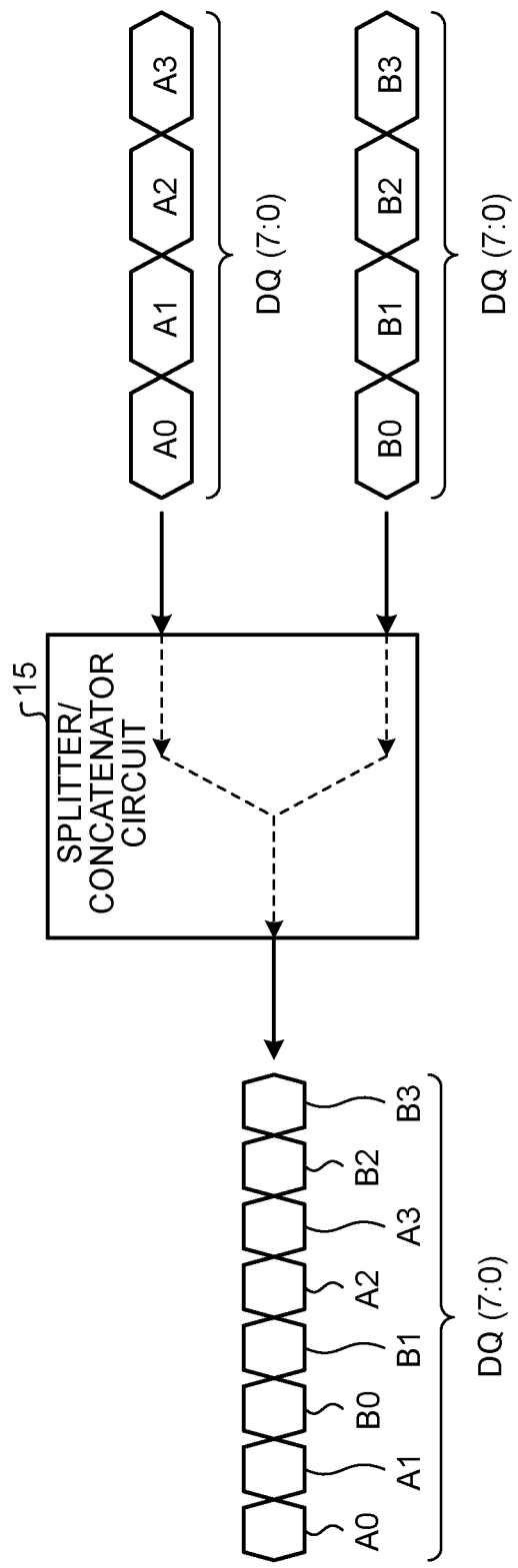
FIG. 6 is a diagram for explaining an example of a data concatenating function of a splitter/concatenator circuit according to the first embodiment.

FIG. 6 is a diagram for explaining an exemplary data concatenating function of the splitter/concatenator circuits 15 and 112 according to the first embodiment. The splitter/concatenator circuit 15 and the splitter/concatenator circuit 112 have the same functions. Thus, the splitter/concatenator circuit 15 is illustrated as a representative of the splitter/concatenator circuits 15 and 112 and its function will be described.

FIG. 6 illustrates a concatenating method of 1-byte data string of data A0, data A1, data A2, and data A3, and another data string of data B0, data B1, data B2, and data B3 concurrently input to the splitter/concatenator circuit 15, as an example. In this case, the splitter/concatenator circuit 15 alternately acquires data in units of 2 bytes from the two input data strings, and sequentially concatenates the 2-byte datasets in the order of acquiring them. As a result, the splitter/concatenator circuit 15 generates a data string of data A0, data A1, data B0, data B 1, data A2, data A3, data B2, and data B3 arranged in this order. The splitter/concatenator circuit 15 outputs the generated data string of data A0, data A1, data B0, data B1, data A2, data A3, data B2, and data B3.

The splitter/concatenator circuit 15 outputs one data string being a concatenation of the two data strings at a transfer frequency twice higher than the transfer frequency of the two data strings when concurrently input. The two data strings are individually input to the splitter/concatenator circuit 15 at the same transfer rate as the transfer rate of the memory channel MCH. Thus, the splitter/concatenator circuit 15 concatenates the two data strings to one data string for output at a transfer rate twice higher than the transfer rate of the memory channel MCH.

Figure 7:
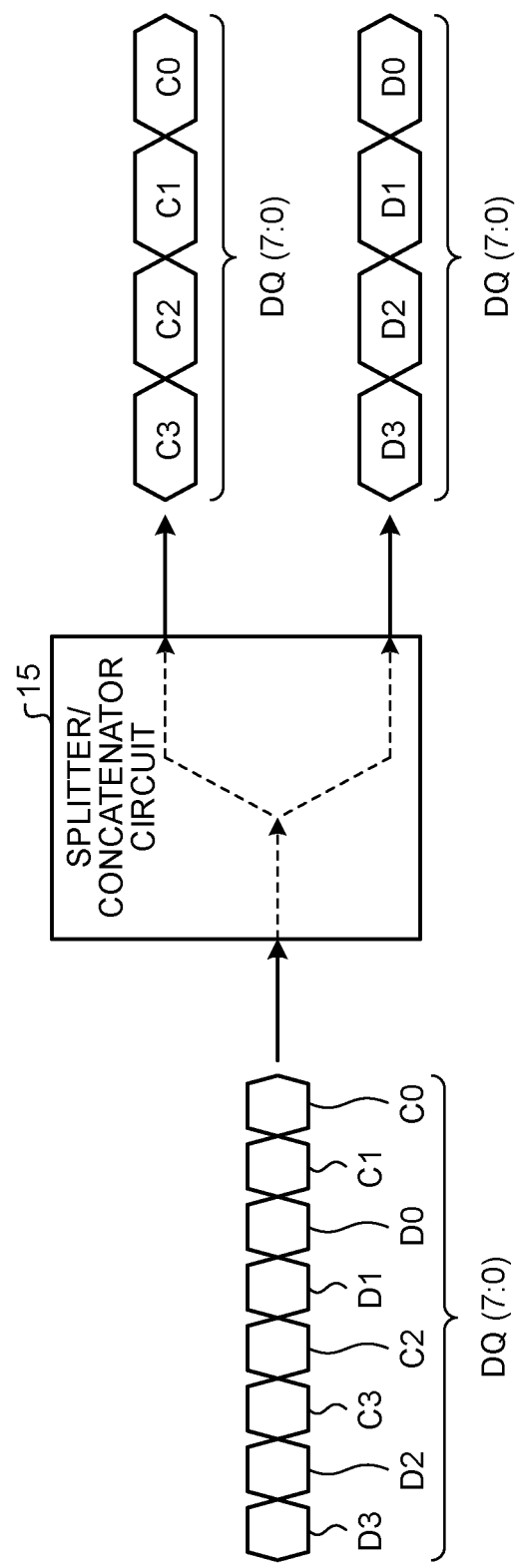
FIG. 7 is a diagram for explaining an example of a data splitting function of the splitter/concatenator circuit according to the first embodiment.

FIG. 7 is a diagram for explaining an exemplary data splitting function of the splitter/concatenator circuits 15 and 112 according to the first embodiment. The splitter/concatenator circuit 15 is illustrated as a representative of the splitter/concatenator circuits 15 and 112 and its function will be described.

FIG. 7 illustrates a method of splitting a 1-byte data string of data C0, data C1, data D0, data D1, data C2, data C3, data D2 and data D3 input to the splitter/concatenator circuit 15.

In this case, the splitter/concatenator circuit 15 acquires data from the input data string in units of 2 bytes and alternately distributes the 2-byte datasets into two paths. As a result, the splitter/concatenator circuit 15 generates two data strings, i.e., one including the data C0, data C1, data C2, and data C3 and the other including the data D0, data D1, data D2, and data D3, from the input data string of the data C0, data C1, data D0, data D1, data C2, data C3, data D2, and data D3, and outputs the two data strings.

The splitter/concatenator circuit 15 outputs each of the two split data strings at half the transfer frequency of the one input data string. One data string is input to the splitter/concatenator circuit 15 at a transfer rate twice higher than the transfer rate of the memory channel MCH. Thus, the splitter/concatenator circuit 15 outputs each of the two split data strings at the same transfer rate as the transfer rate of the memory channel MCH.

The data-string concatenating method and the data-string splitting method by the splitter/concatenator circuit 15 and 112 are not limited to the examples described above.

For example, the splitter/concatenator circuit 15 and 112 may receive two pieces of 8-bit transfer data from the two channels and convert each of them into 4-bit transfer data, and concatenate the converted two pieces of 4-bit transfer data to output the concatenated 8-bit transfer data to one of the channels at a transfer frequency twice higher than the transfer frequency before the concatenation.

When receiving 8-bit transfer data from one of the channels, the splitter/concatenator circuits 15 and 112 split the 8-bit transfer data into two pieces of 4-bit transfer data. The splitter/concatenator circuit 15 and 112 may convert the two pieces of temporally consecutive 4-bit transfer data to two pieces of 8-bit transfer data to output the two pieces of 8-bit transfer data to the two respective channels at half the transfer frequency of the transfer data before the splitting.

Figure 8:
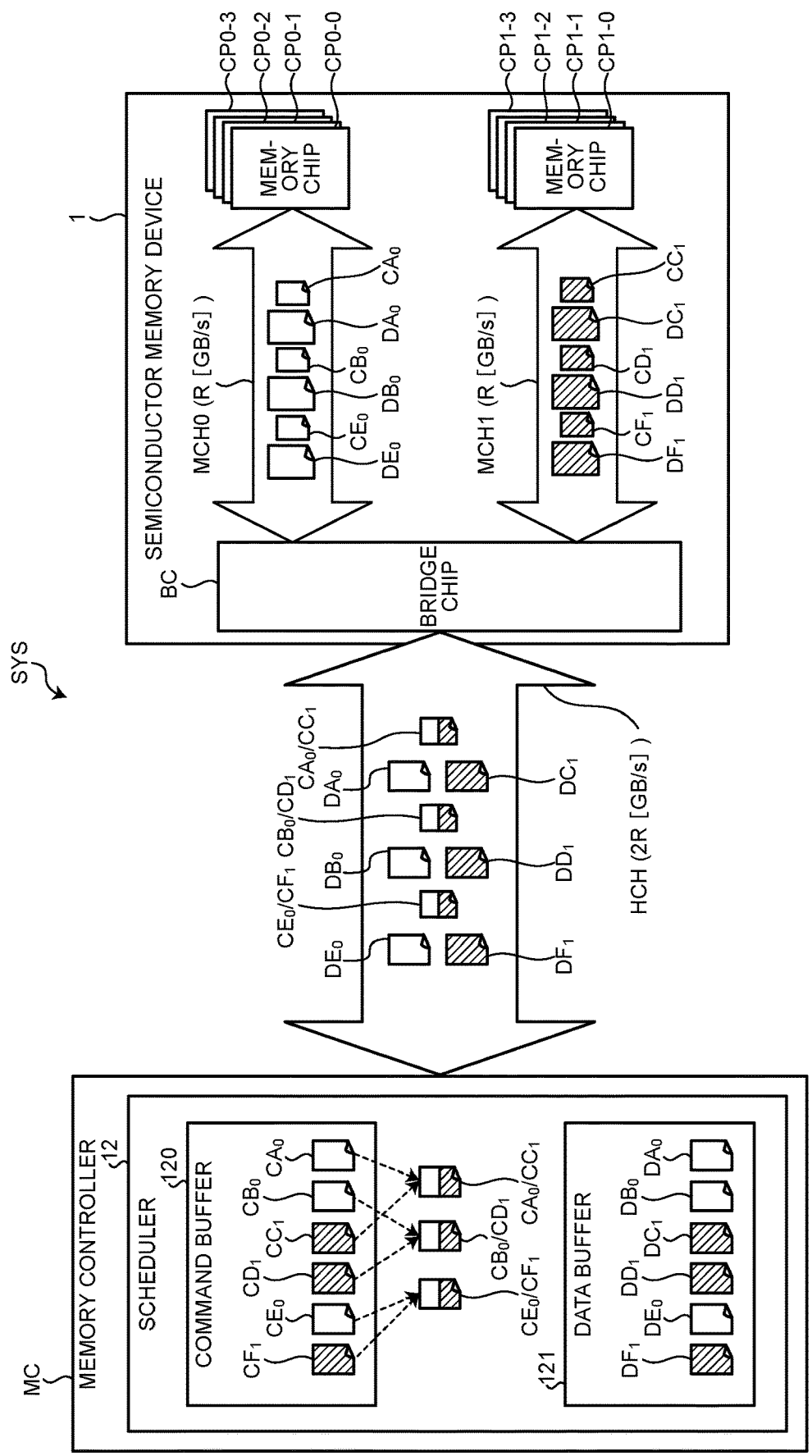
FIG. 8 is a schematic diagram for explaining an example of a flow of data in the memory system according to the first embodiment.

FIG. 8 is a schematic diagram for explaining an example of a flow of data in the memory system SYS according to the first embodiment. FIG. 8 omits illustrating some of the elements included in the memory system SYS. The transfer rate of the memory channel MCH is defined as R (GB/s). Thus, to transfer one concatenated data string of two data strings through the host channel HCH, the transfer rate of the host channel HCH is set to 2R (GB/s).

For example, as illustrated in FIG. 8, the CPU 11 sequentially stores an access request $CA_0$ for requesting transfer of data $DA_0$, an access request $CB_0$ for requesting transfer of data $DB_0$, an access request $CC_1$ for requesting transfer of data $DC_1$, an access request $CD_1$ for requesting transfer of data $DD_1$, an access request $CE_0$ for requesting transfer of data $DE_0$, and an access request $CF_1$ for requesting transfer of data $DF_1$ in this order in the command buffer 120. The data $DA_0$, data $DB_0$, data $DC_1$, data $DD_1$, data $DE_0$, and data $DF_1$ are stored in the data buffer 121. The numerical value "0" or "1" attached to the data DX and the access request CX corresponds to the channel number of the memory channel MCH connected to the memory chip CP to be accessed. The data $DX_0$ is addressed to the memory chip CP connected to the memory channel MCH0. The data $DX_1$ is addressed to the memory chip CP connected to the memory channel MCH1.

The processor 122 of the scheduler 12 changes the schedule for executing these access requests in such a manner that two data transfers occur at the same time using the memory channel MCH0 and using the memory channel MCH1 in the semiconductor memory device 1. Specifically, the processor 122 acquires a pair of the access request $CA_0$ for transfer of the data $DA_0$ and the access request $CC_1$ for transfer of the data $DC_1$ to cause the corresponding flash controllers 14 to execute these access requests. The processor 122 then acquires a pair of the access request $CB_0$ for transfer of the data $DB_0$ and the access request $CD_1$ for transfer of the data $DD_1$ and causes the corresponding flash controllers 14 to execute the respective access requests. Subsequently, the processor 122 acquires a pair of the access request $CE_0$ for transfer of the data $DE_0$ and the access request $CF_1$ for transfer of the data $DF_1$ to cause the corresponding flash controllers 14 to execute the respective access requests.

The host channel HCH transfers the pair of the access request $CA_0$ and the access request $CC_1$, the concatenated data pair $DA_0$ and $DC_1$, the pair of the access request $CB_1$ and the access request $CD_1$, the concatenated data pair $DB_0$ and $DD_1$, the pair of the access request $CE_0$ and the access request $CF_1$, and the concatenated data pair $DE_0$ and $DF_1$. In this example, transferred are pairs of access requests and concatenated data pairs alone so that the host channel HCH can be maintained at the transfer rate of 2R (GB/s).

In the bridge chip BC of the semiconductor memory device 1, a concatenation of a data pair is split into separate pieces of data by the splitter/concatenator circuit 112. The access request $CA_0$, the data $DA_0$, the access request $CB_0$, the data $DB_0$, the access request $CB_0$, and the data $DE_0$ are transferred to the memory channel MCH0 at a transfer rate of R (GB/s). In parallel with the transfer in the memory channel MCH0, the access request $CC_1$, the data $DC_1$, the access request $CD_1$, the data $DD_1$, the access request $CF_1$, and the data $DF_1$ are transferred in the memory channel MCH1 at a transfer rate of R (GB/s).

Figure 9:
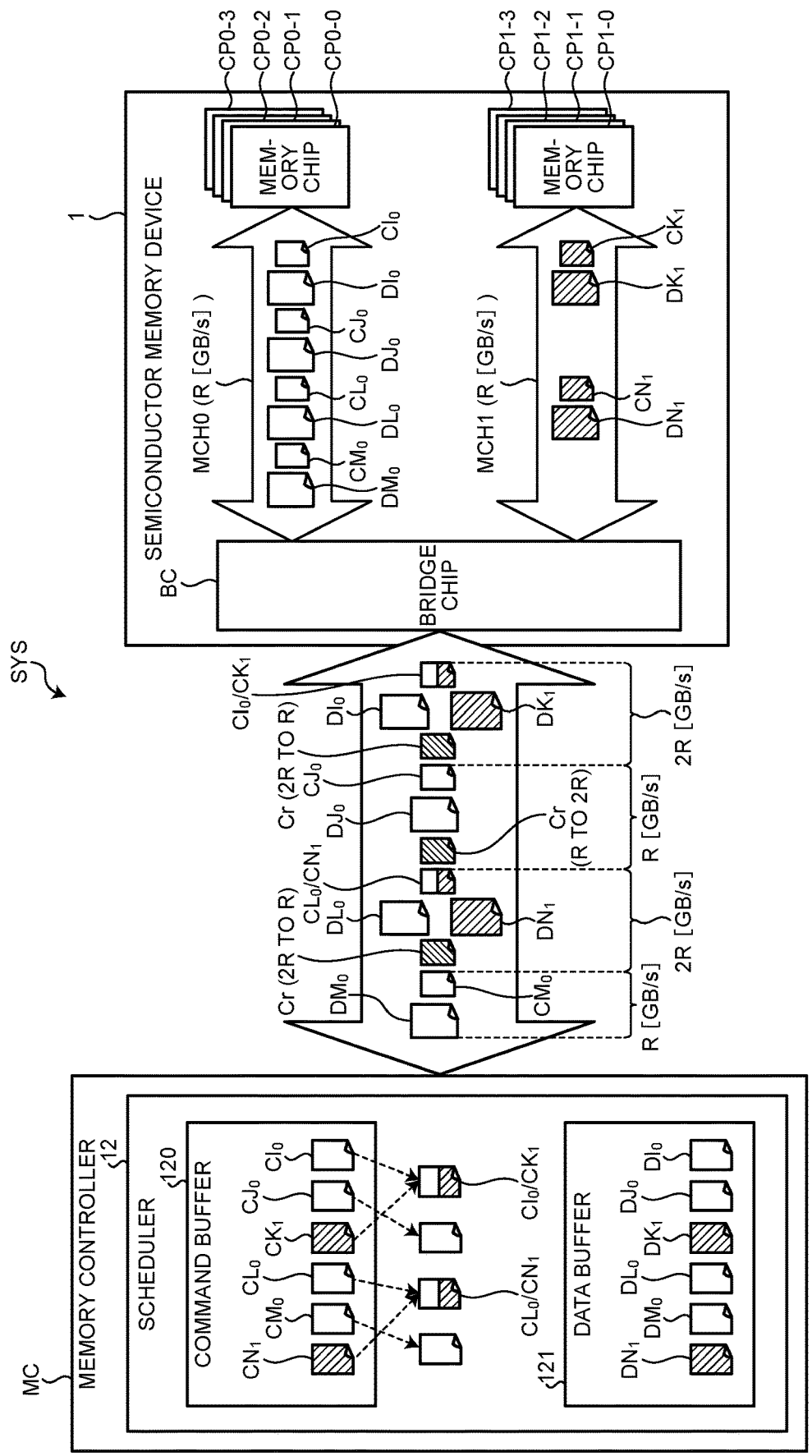
FIG. 9 is a schematic diagram for explaining another example of a flow of data in the memory system according to the first embodiment.

FIG. 9 is a schematic diagram for explaining another exemplary flow of data in the memory system SYS according to the first embodiment. FIG. 9 illustrates a flow of data when an unpaired access request occurs.

In this example, the CPU 11 sequentially stores an access request for transfer of data $DI_0$, an access request for transfer of data $DJ_0$, an access request for transfer of data $DK_1$, an access request for transfer of data $DL_0$, an access request for transfer of data $DM_0$, and an access request for transfer of data $DN_1$ in this order in the command buffer 120.

For example, when the command buffer 120 stores the access request $CI_0$ for transfer of the data $DI_0$, the access request $CJ_0$ for transfer of the data $DJ_0$, the access request $CK_1$ for transfer of the data $DK_1$, the access request $CL_0$ for transfer of the data $DL_0$, and the access request $CM_0$ for transfer of the data $DM_0$, but has not the access request $CN_1$ for transfer of the data $DN_1$ inputted thereto, the processor 122 first acquires a pair of the access request $CI_0$ and the access request $CK_1$ for transfer of the data $DI_0$ and the data $DK_1$, respectively, to cause the corresponding flash controllers 14 to execute the respective access requests.

The command buffer 120 has not yet stored an access request to be paired with the access request $CJ_0$ for transfer of the data $DJ_0$. Thus, the access request $CJ_0$ for transfer of the data $DJ_0$ corresponds to an unpaired access request. The processor 122 inputs the access request $CJ_0$ for transfer of the data $DJ_0$ solo to the first flash controller 14-0.

In response to an input of the access request $CN_1$ for transfer of the data $DN_1$ to the command buffer 120, the processor 122 acquires a pair of the access requests $CL_0$ and $CN_1$ for transfer of the data $DL_0$ and $DN_1$, respectively, to cause the corresponding flash controllers 14 to execute the respective access requests.

The processor 122 then regards the access request $CM_0$ for transfer of the data $DM_0$ as an unpaired access request and inputs the access request $CM_0$ solo to the first flash controller 14-0.

The host channel HCH transfers the data pairs at a transfer rate of 2R (GB/s) and the solo data at a transfer rate of R (GB/s). The scheduler 12 changes the transfer rate of the host channel HCH for transferring solo data after a data pair and for transferring a data pair after solo data. Specifically, to change the transfer rate, the memory controller MC transmits a rate change command Cr.

Thus, the host channel HCH transfers the pair of the access request $CI_0$ and the access request $CK_1$, the concatenated data pair $DI_0$ and $DK_1$, and the rate change command Cr for changing the transfer rate from 2R (GB/s) to R (GB/s) at the transfer rate of 2R (GB/s). The host channel HCH transfers the access request $CJ_0$, the data $DJ_0$, and the rate change command Cr for changing the transfer rate from R (GB/s) to 2R (GB/s) at the transfer rate of R (GB/s). The host channel HCH transfers, at a transfer rate of 2R (GB/s), the pair of the access request $CL_0$ and the access request $CN_1$, the concatenated data pair $DL_0$ and $DN_1$, and the rate change command Cr for changing the transfer rate from 2R (GB/s) to R (GB/s). The host channel HCH transfers the access request $CM_0$ and the data $DM_0$ at a transfer rate of R (GB/s).

As such, the transfer rate of the host channel HCH is changed in response to occurrence of an unpaired access request. To change the transfer rate of the host channel HCH, the memory controller MC is to perform transfer-rate changing processing to the bridge chip BC.

Figure 10:
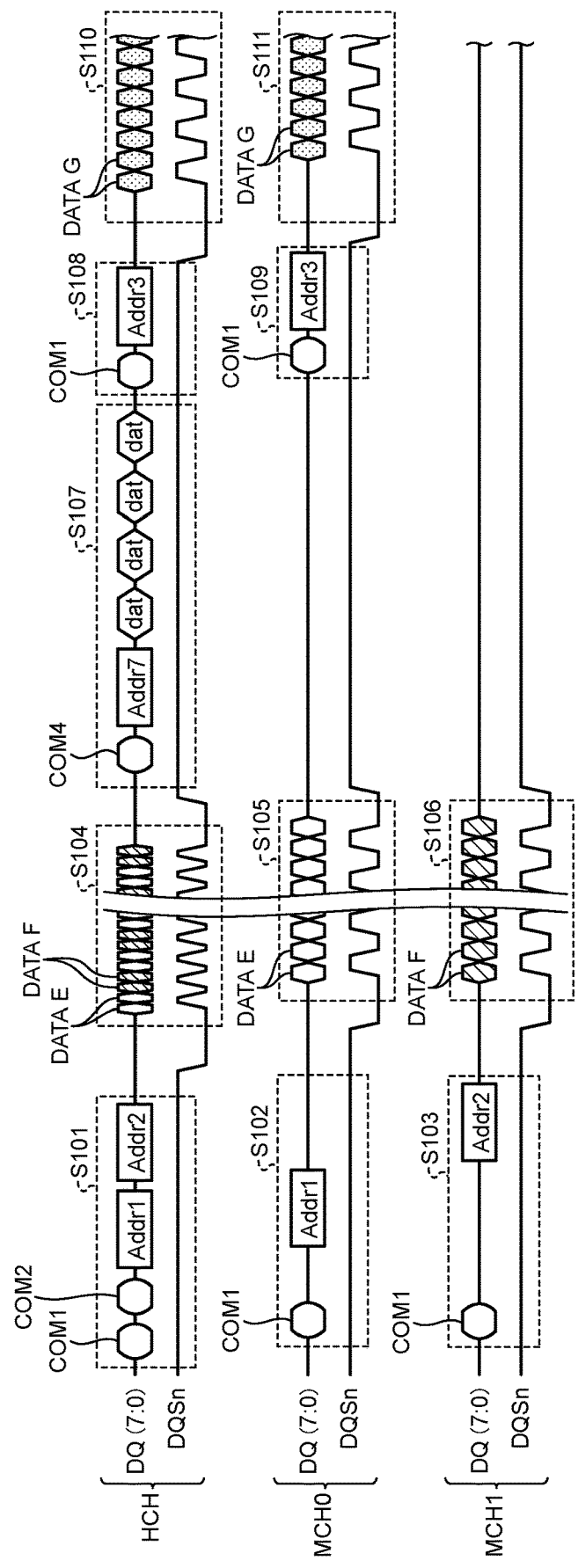
FIG. 10 is a timing chart for illustrating an example of a method of changing a transfer rate of a host channel according to the first embodiment.

FIG. 10 is a timing chart illustrating an example of a method of changing the transfer rate of the host channel HCH according to the first embodiment. FIG. 10 illustrates an example of executing a pair of access requests designating a write operation as an access type and then executing an unpaired access request designating a write operation as an access type. FIG. 10 illustrates the waveforms of the data signal DQ(7:0) and the data strobe signal DQSn among the signals transferred through the host channel HCH, the memory channel MCH0, and the memory channel MCH1.

First, the memory controller MC transfers a write command COM1, a parallel transfer command COM2, a first address Addr1, and a second address Addr2 as the data signal DQ(7:0) to the bridge chip BC in this order via the host channel HCH (S101). The write command COM1 is a command for requesting a write operation. The parallel transfer command COM2 is a command for giving a notice of transfer of a concatenation of multiple (herein, two) pieces of data. The first address Addr1 indicates a location to be accessed in the memory chips CP0 connected to the memory channel MCH0. The second address Addr2 indicates a location to be accessed in the memory chips CP1 connected to the memory channel MCH1.

For the memory channel MCH0, the bridge chip BC masks the parallel transfer command COM2 and the second address Addr2 among the write command COM1, the parallel transfer command COM2, the first address Addr1, and the second address Addr2, and transfers the write command COM1 and the first address Addr1 thereto (S102). For the memory channel MCH1, the bridge chip BC masks the parallel transfer command COM2 and the first address Addr1 among the write command COM1, the parallel transfer command COM2, the first address Addr1, and the second address Addr2, and transfers the write command COM1 and the second address Addr2 thereto (S103).

After transferring the command sequence of the write command COM1, the parallel transfer command COM2, the first address Addr1, and the second address Addr2, the memory controller MC transfers a concatenation of data E addressed to the location indicated by the first address Addr1 (that is, write destination) and data F addressed to the location indicated by the second address Addr2 (that is, write destination) to the bridge chip BC (S104). Of the data transferred in S104, 1-byte data constituting the data E is represented by the open hexagon, and 1-byte data constituting the data F is represented by the hatched hexagon. To transfer the concatenation of data E and data F, the memory controller MC transfers the data signal DQ(7:0) and the data strobe signal DQSn at a frequency twice higher than the transfer frequency of the memory channel MCH.

The bridge chip BC splits the concatenation of data E and data F into data E and data F. The bridge chip BC then transfers the data E to the memory channel MCH0 (S105) and transfers the data F to the memory channel MCH1 (S106).

After the transfer of the concatenation of the data E and the data F, the memory controller MC performs transfer-rate changing processing to execute an unpaired access request (S107).

In S107, the memory controller MC changes the transfer rate of the host channel HCH from twice the transfer rate of the memory channel MCH to the same transfer rate as the memory channel MCH. For example, the memory controller MC transmits a SetFeature command COM4 to set new transfer-rate information 114 in the register 115 together with an address Addr7 of the register 115 and data (dat) representing the new transfer-rate information 114. Herein, the new transfer-rate information 114 includes a description that the host channel HCH is to be set at the same transfer rate as the transfer rate of the memory channel MCH. The bridge chip BC stores the new transfer-rate information 114 in the register 115 in an overwriting manner. In accordance with the new transfer-rate information 114, the bridge chip BC sets the first interface 101 to allow data transfer via the host channel HCH at the same transfer rate as the transfer rate of the memory channel MCH. The SetFeature command COM4 is an exemplary change command Cr shown in FIG. 9.

Subsequently, the memory controller MC transfers the write command COM1 and a third address Addr3 as the data signal DQ(7:0) to the bridge chip BC via the host channel HCH in this order (S108). Herein, the third address Addr3 indicates a location to be accessed in the memory chip CP connected to any of the memory channels MCH. As an example, the third address Addr3 indicates a location to be accessed in the memory chips CP0 connected to the memory channel MCH0.

The bridge chip BC transfers the write command COM1 and the third address Addr3 to the memory channel MCH0 (S109).

After transferring the write command COM1 and the third address Addr3, the memory controller MC transfers data G addressed to the location indicated by the third address Addr3 (that is, write destination) to the bridge chip BC (S110). Herein, 1-byte data constituting the data G is represented by the dot-hatched hexagon. To transfer the data G, the memory controller MC transfers the data signal DQ(7:0) and the data strobe signal DQSn at the same frequency as the transfer frequency of the memory channel MCH in S110.

The bridge chip BC transfers the data G to the memory channel MCH0 (S111).

As such, to transfer non-concatenated, solo data after a concatenation of two pieces of data, the memory controller MC changes the transfer rate of the host channel HCH from the transfer rate twice higher than the transfer rate of the memory channel MCH to the same transfer rate as the transfer rate of the memory channel MCH.

To transfer a concatenation of two pieces of data after non-concatenated, solo data, the memory controller MC performs processing similar to S107 to change the transfer rate of the host channel HCH from the same transfer rate as the transfer rate of the memory channel MCH to the transfer rate twice higher than the transfer rate of the memory channel MCH.

Figure 11:
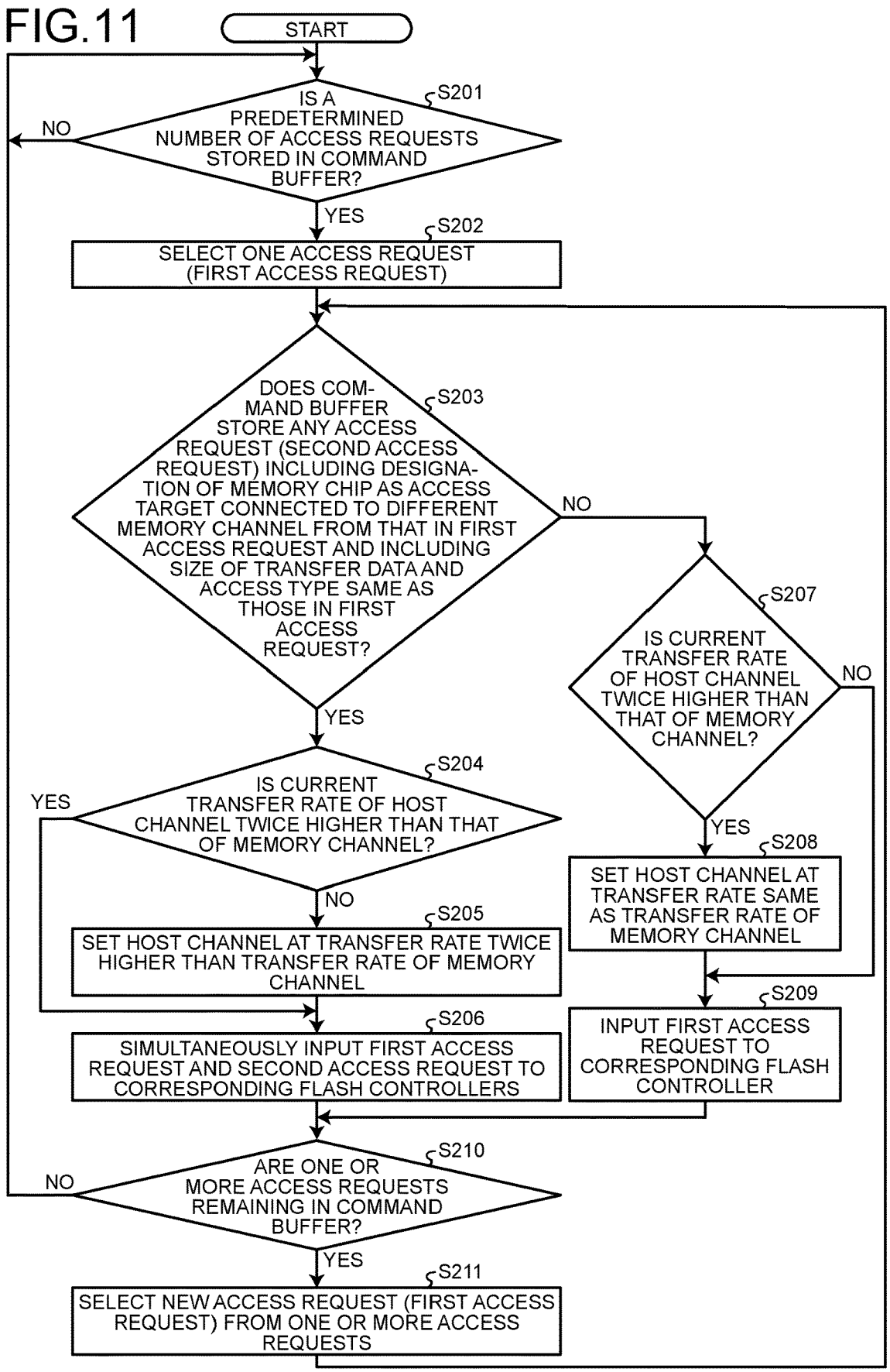
FIG. 11 is a flowchart illustrating an example of a scheduler operation according to the first embodiment.

FIG. 11 is a flowchart illustrating an exemplary operation of the scheduler 12 according to the first embodiment. FIG. 11 omits illustrating the operation of storing an access request in the command buffer 120. As an example, an access request is issued by the CPU 11 and then stored in the command buffer 120 asynchronously with the series of operations illustrated in FIG. 11.

First, the processor 122 determines whether the command buffer 120 stores a predetermined number of access requests (S201). The predetermined number may be set to one or two or more.

When the number of access requests stored in the command buffer 120 is less than the predetermined number (S201: No), the processor 122 performs the determination of S201 again to postpone the next processing until the number of access requests stored in the command buffer 120 reaches the predetermined number.

When the predetermined number of access requests is stored in the command buffer 120 (S201: Yes), the processor 122 selects one of the predetermined number of access requests stored in the command buffer 120 (S202). For example, the processor 122 selects the access request having been stored in the command buffer 120 at the earliest timing. The method of selecting the access request is not limited to this method. The access request selected in S202 is referred to as a first access request.

Subsequently, the processor 122 determines whether the command buffer 120 stores any access request including a designation of the memory chip CP as the access target connected to a different memory channel MCH from that in the first access request and including a size of transfer data and an access type same as those in the first access request (S203). Such an access request designating the memory channel MCH different from that in the first access request and the transfer-data size and access type same as those in the first access request is referred to as a second access request.

When the second access request is stored in the command buffer 120 (S203: Yes), the processor 122 determines whether the host channel HCH is currently set at a transfer rate twice higher than the transfer rate of the memory channel MCH (S204).

When the current transfer rate of the host channel HCH is not twice higher than the transfer rate of the memory channel MCH (S204: No), the processor 122 sets the host channel HCH at a transfer rate twice higher than the transfer rate of the memory channel MCH (S205). For example, the processor 122 inputs a request for setting the transfer rate of the host channel HCH at twice higher than the transfer rate of the memory channel MCH to one of the flash controllers 14, to allow the flash controller 14 to set the transfer-rate information 114 in the register 115 included in the bridge chip BC.

When the current transfer rate of the host channel HCH is twice higher than the transfer rate of the memory channel MCH (S204: Yes) or after S205, the processor 122 concurrently inputs the first access request and the second access request to the first flash controller 14-0 and the second flash controller 14-1 corresponding to the memory channels MCH connected to the memory chips CP indicated as the access targets (S206).

When the second access request is not stored in the command buffer 120 (S203: No), the processor 122 determines whether the host channel HCH is currently set at a transfer rate twice higher than the transfer rate of the memory channel MCH (S207).

When the current transfer rate of the host channel HCH is twice higher than the transfer rate of the memory channel MCH (S207: Yes), the processor 122 sets the host channel HCH at a transfer rate same as the transfer rate of the memory channel MCH (S208). For example, the processor 122 inputs a request for setting the host channel HCH at a transfer rate same as that of the memory channel MCH to either of the flash controllers 14 to allow the flash controller 14 to set the transfer-rate information 114 in the register 115 included in the bridge chip BC.

When the current transfer rate of the host channel HCH is not twice higher than the transfer rate of the memory channel MCH (S207: No) or after S208, the processor 122 inputs the first access request to either of the first flash controller 14-0 and the second flash controller 14-1 corresponding to the memory channel MCH connected to the memory chip CP designated as the access target (S209).

After S206 or S209, the processor 122 determines whether one or more other access requests are stored in the command buffer 120 (S210). When one or more access requests are remaining in the command buffer 120 (S210: Yes), the processor 122 selects a new access request from the one or more access requests in the command buffer 120 (S211). The processor 122 repeats the processing from S203 with respect to the access request selected in S211, i.e., the first access request.

When one or more access requests are not remaining in the command buffer 120 (S210: No), the processor 122 repeats the processing from S201.

In the above example, when the first access request is an unpaired access request, i.e., when the determination of S203 results in No, the processor 122 immediately causes one of the flash controllers 14 to execute the first access request. However, the processing related to the unpaired, first access request is not limited to this example.

For example, with respect to the first access request being an unpaired access request, the processor 122 postpones the execution of the first access request for a predetermined time. When the first access request is still unpaired after the predetermined time elapses, the processor 122 may cause one of the flash controllers 14 to execute the first access request. If a new access request being the second access request is stored in the command buffer 120 before elapse of the predetermined time, the processor 122 may proceed to S204. While postponing the execution of the first access request being an unpaired access request, the processor 122 may select a new access request as the first access request and then perform the processing from S203.

The above description includes an example that the single semiconductor memory device 1 is connected to the memory controller MC via the single host channel HCH. The techniques of the first embodiment are also applicable to a memory system including multiple semiconductor memory devices 1.

Figure 12:
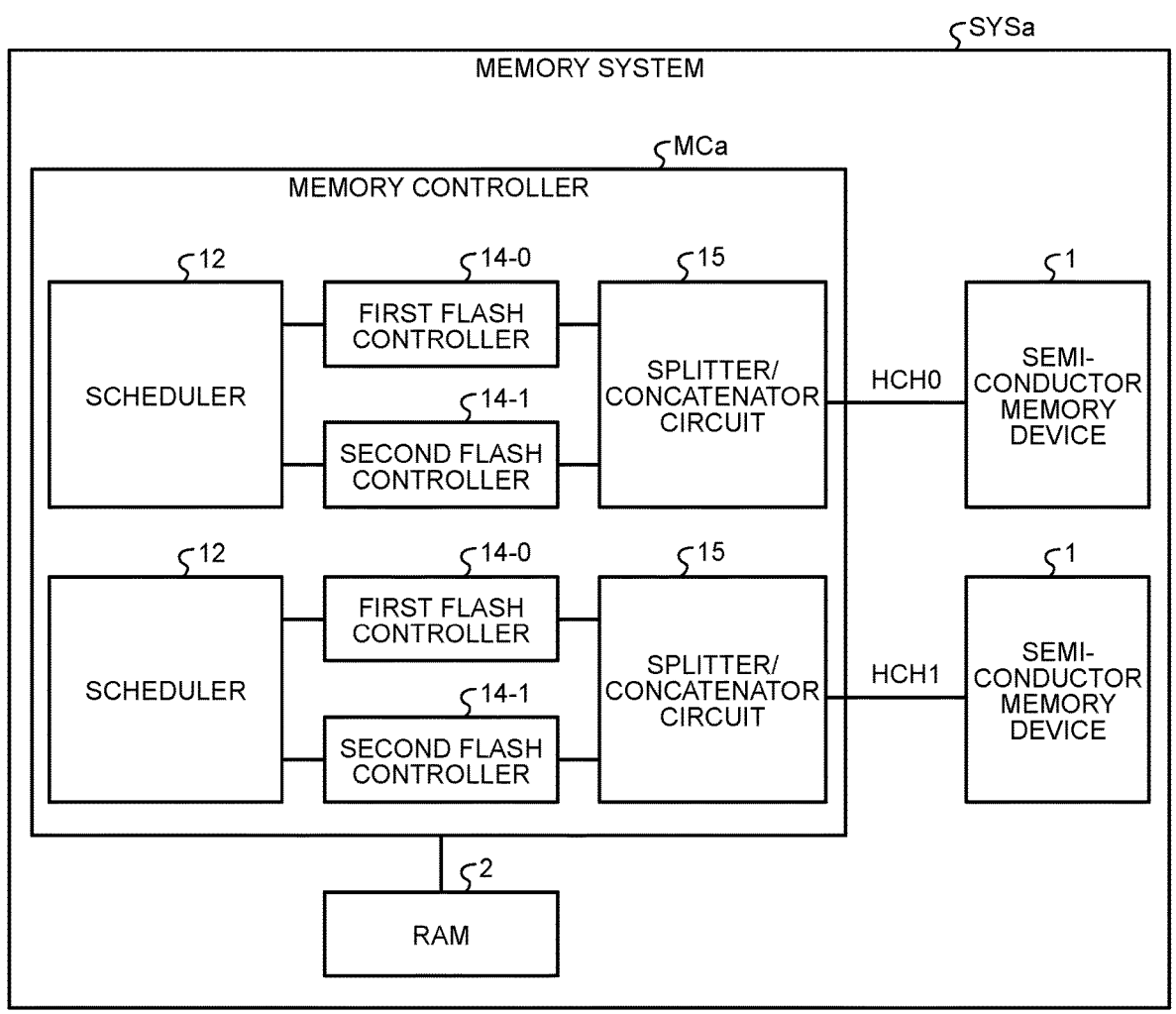
FIG. 12 is a schematic diagram illustrating another exemplary configuration of the memory system according to the first embodiment.

FIG. 12 is a schematic diagram illustrating another exemplary configuration of the memory system according to the first embodiment. A memory system SYSa illustrated in FIG. 12 includes two semiconductor memory devices 1 as an example of the multiple semiconductor memory devices 1. One of the two semiconductor memory devices 1 is connected to a memory controller MCa via a host channel HCH0. The other of the two semiconductor memory devices 1 is connected to the memory controller MCa via a host channel HCH1.

The memory controller MCa includes a set of the scheduler 12, two flash controllers 14, and a splitter/concatenator circuit 15 for each host channel HCH. Each set of the scheduler 12, the two flash controllers 14, and the splitter/concatenator circuit 15 perform the same operations as the elements with the same names described with reference to FIGS. 1 to 11.

Further, the above description includes an example that the semiconductor memory device 1 includes two memory channels MCH. The semiconductor memory device 1 may include three or more memory channels MCH, to allow one or more memory chips CP to be connectable to each of the memory channels MCH.

For example, to be able to control the semiconductor memory device 1 including N (N is an integer of 2 or more) memory channels MCH and one or more memory chips CP connected to each of the memory channels MCH, the memory controller MC is provided with N or more than N flash controllers 14 for each host channel HCH. The scheduler 12 sequentially acquires, from among the access requests stored in the command buffer 120, a set of N access requests designating as access targets the memory chips CP connected to mutually different memory channels MCH. The scheduler 12 then inputs the individual access requests of the acquired set to different flash controllers 14 among the N flash controllers 14. The N flash controllers 14 individually perform data transfers in parallel responsive to the input access requests.

Specifically, according to the first embodiment, the memory controllers MC and MCa generate a plurality of access requests each of which is for requesting transfer of data, designating as an access target one of the memory chips CP included in the single semiconductor memory device 1. The scheduler 12 determines the order of execution of N access requests so as to allow concurrent execution of the N access requests designating as access targets the respective memory chips CP connected to the mutually different memory channels MCH. The memory controllers MC and MCa execute transfers of N pieces data in parallel responsive to the N access requests via the host channel HCH at a transfer rate N times higher than the transfer rate of the memory channel MCH.

As such, the semiconductor memory device 1 can use all of the N memory channels MCH at the same time, which results in improving the transfer efficiency between the memory controllers MC and MCa and the semiconductor memory device 1. In other words, the memory controllers MC and MCa have a suitable configuration to be able to perform data transfer to the semiconductor memory device 1 with higher efficiency.

In addition, according to the first embodiment, the memory controllers MC and MCa sequentially identify, from among the access requests stored in the command buffer 120, one or more sets of N access requests designating as access targets the respective memory chips CP connected to the mutually different memory channels MCH. The memory controllers MC and MCa then execute the N access requests included in each of the one or more sets in parallel.

In such a manner, the memory controllers MC and MCa can transfer data to the semiconductor memory device 1 wither higher efficiency.

The above description includes an example that in response to an unpaired access request, the memory controllers MC and MCa change the transfer rate of the host channel HCH from the transfer rate twice higher than the transfer rate of the memory channel MCH to the same transfer rate as the transfer rate of the memory channel MCH. With respect to the semiconductor memory device 1 including N memory channels MCH, however, the memory controllers MC and MCa may be configured to operate in the following manner, for example. When the number of access requests designating the memory chips CP connected to different memory channels MCH as access targets matches M (M is an integer of 1 or more and less than N), the memory controllers MC and MCa change the transfer rate of the host channel HCH from N times higher to M times higher than the transfer rate of the memory channel MCH, to execute the M access requests in parallel.

Second Embodiment

In the first embodiment, the memory controller MC changes the transfer rate of the host channel HCH from N times to M times higher than the transfer rate of the memory channel MCH when the number of access requests designating the memory chips CP connected to different memory channels MCH as access targets matches M (M is an integer of 1 or more and less than N). In a second embodiment, for the purpose of reducing the length of time required to change the transfer-rate setting of the host channel HCH, the host channel HCH is constantly maintained at a transfer rate N times higher than the transfer rate of the memory channel MCH.

A memory system SYSb according to the second embodiment will be described below. The following will mainly describe differences from the memory system SYS of the first embodiment and omit or briefly describe the same or like features as those of the memory system SYS of the first embodiment. As with the first embodiment, the second embodiment will describe the semiconductor memory device 1 including two memory channels MCH0 and MCH1, by way of example. Thus, N is defined as 2.

Figure 13:
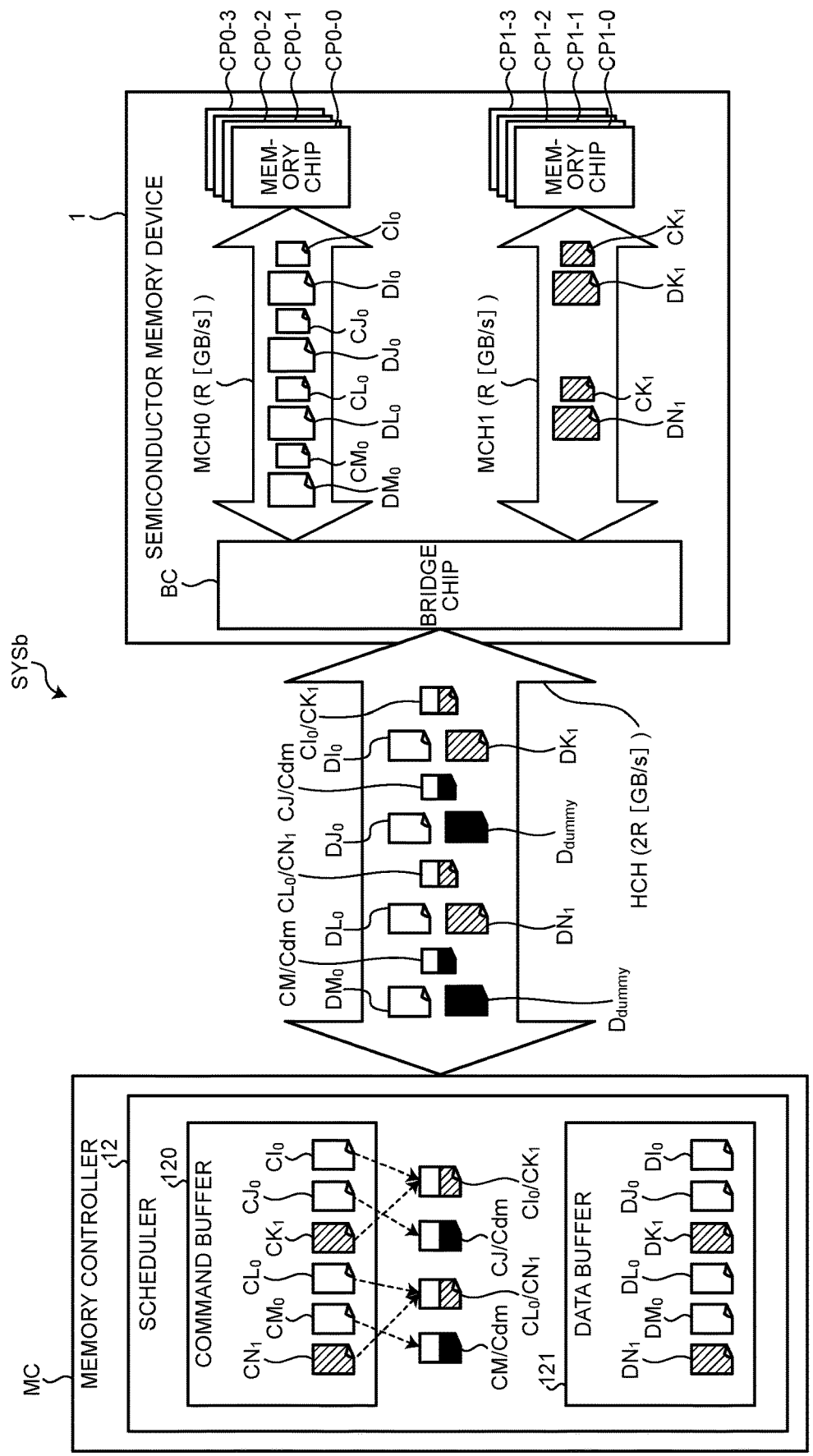
FIG. 13 is a schematic diagram for explaining an example of a flow of data in a memory system according to a second embodiment.

FIG. 13 is a schematic diagram for explaining an example of a flow of data in the memory system SYSb according to the second embodiment. FIG. 13 illustrates a flow of data when an unpaired access request occurs.

Similar to the example described with reference to FIG. 9, the CPU 11 sequentially stores, in the command buffer 120, an access request $CI_0$ for transfer of data $DI_0$, an access request $CJ_0$ for transfer of data $DJ_0$, an access request $CK_1$ for transfer of data $DK_1$, an access request $CL_0$ for transfer of data $DL_0$, an access request $CM_0$ for transfer of data $DM_0$, and an access request $CN_1$ for transfer of data $DN_1$ in this order.

For example, when the command buffer 120 stores the access request $CI_0$ for transfer of data $DI_0$, the access request $CJ_0$ for transfer of data $DJ_0$, the access request $CK_1$ for transfer of data $DK_1$, the access request $CL_0$ for transfer of data $DL_0$, and the access request $CM_0$ for transfer of the data $DM_0$, but has not the access request $CN_1$ for transfer of data $DN_1$ inputted thereto, the processor 122 first acquires a pair of the access request $CI_0$ for transfer of data $DI_0$ and the access request $CK_1$ for transfer of data $DK_1$ to cause the corresponding flash controllers 14 to execute the respective access requests.

The command buffer 120 has not yet stored an access request to be paired with the access request $CJ_0$ for transfer of data $DJ_0$. In response to occurrence of an unpaired access request such as the access request $CJ_0$ for transfer of data $DJ_0$, the processor 122 generates a dummy access flag Cdm for requesting transfer of dummy data $D_{dummy}$ for the same type of access as in the unpaired access request. The dummy data $D_{dummy}$ is, for example, all-zero data. The dummy data $D_{dummy}$ is, however, not limited to such an example. The dummy access flag Cdm for transfer of the dummy data $D_{dummy}$ is the same as the unpaired access request in terms of access type and size of the dummy data $D_{dummy}$. It should be noted that the element that generates the dummy access flag Cdm is not limited to the processor 122. The scheduler may monitor the command buffer 120, and may inset, in response to occurrence of an unpaired access request such as the access request $CJ_0$ for transfer of data $DJ_0$, the dummy access flag Cdm. In such a case, the dummy data $D_{dummy}$ is generated internally.

The processor 122 inputs the access request $CJ_0$ for transfer of data $DJ_0$ to the first flash controller 14-0 and the dummy access flag Cdm for transfer of dummy data $D_{dummy}$ to the second flash controller 14-1 at the same time.

The first flash controller 14-0 and the second flash controller 14-1 execute, at the same time, the access request $CJ_0$ for transfer of data $DJ_0$ and the dummy access flag Cdm for transfer of the dummy data $D_{dummy}$, respectively.

When the unpaired access request $CJ_0$ for transfer of data $DJ_0$ and the dummy access flag Cdm for transfer of dummy data $D_{dummy}$ are both read requests, the first flash controller 14-0 transfers an output command for the data $DJ_0$ to the bridge chip BC while the second flash controller 14-1 transfers an output command for the dummy data $D_{dummy}$ to the bridge chip BC. In the bridge chip BC, the command decoder 111 of the controller 103 transfers the output command for the data $DJ_0$ to the memory chip CP0, designated by the access request $CJ_0$ as the access target, connected to the memory channel MCH0, to acquire the data $DJ_0$. The command decoder 111 also interprets the output command for the dummy data D dummy to generate the dummy data $D_{dummy}$ for output. The command decoder 111 then inputs the read data and the dummy data $D_{dummy}$ to the splitter/concatenator circuit 112 concurrently. The splitter/concatenator circuit 112 concatenates the data $DJ_0$ and the dummy data $D_{dummy}$ and transfers the concatenated data to the memory controller MCa via the host channel HCH at a transfer rate twice higher than the transfer rate of the memory channel MCH.

When the unpaired access request $CJ_0$ for transfer of the data $DJ_0$ and the dummy access flag Cdm for transfer of the dummy data $D_{dummy}$ are both write requests, the first flash controller 14-0 inputs the data $DJ_0$ to the splitter/concatenator circuit 15, and at the same time the second flash controller 14-1 generates and inputs the dummy data $D_{dummy}$ to the splitter/concatenator circuit 15. The splitter/concatenator circuit 15 concatenates the data $DJ_0$ and the dummy data D dummy and transfers the concatenated data to the bridge chip BC via the host channel HCH at a transfer rate twice higher than the transfer rate of the memory channel MCH. In the bridge chip BC, the splitter/concatenator circuit 112 splits the concatenation of the data $DJ_0$ and the dummy data $D_{dummy}$ into the data $DJ_0$ and the dummy data $D_{dummy}$. The controller 103 discards the dummy data $D_{dummy}$ and transfers the data $DJ_0$ to the memory chip CP0 being the access target connected to the memory channel MCH0.

Subsequently, in response to an input of the access request $CN_1$ for transfer of data $DN_1$ to the command buffer 120, the processor 122 acquires a pair of the access request $CL_0$ for transfer of data $DL_0$ and the access request $CN_1$ for transfer of data $DN_1$ to cause the corresponding flash controllers 14 to execute the respective access requests.

The processor 122 regards the access request $CM_0$ for transfer of data $DM_0$ as an unpaired access request. Thus, similar to the access request $CJ_0$ for transfer of the data $DJ_0$, the processor 122 inputs the access request $CM_0$ for transfer of data $DM_0$ to the first flash controller 14-0 and the access request Ddm for transfer of the dummy data $D_{dummy}$ to the second flash controller 14-1 at the same time.

In this manner, in response to some unpaired access request (referred to as a first access request), the memory controller MC generates an access request (referred to as a second access request) for transfer of the dummy data $D_{dummy}$ to pair the second access request with the first access request. The memory controller MC transfers the concatenation of the data related to the first access request and the dummy data $D_{dummy}$ via the host channel HCH at a transfer rate twice higher than the transfer rate of the memory channel MCH. Thus, irrespective of occurrence of an unpaired access request, the memory controller MC can maintain the host channel HCH at the transfer rate twice higher than the transfer rate of the memory channel MCH, eliminating the necessity to change the transfer rate. In other words, the second embodiment does not require a time for changing the transfer-rate setting of the host channel HCH in order to process an unpaired access request, thereby improving the data transfer efficiency.

Figure 14:
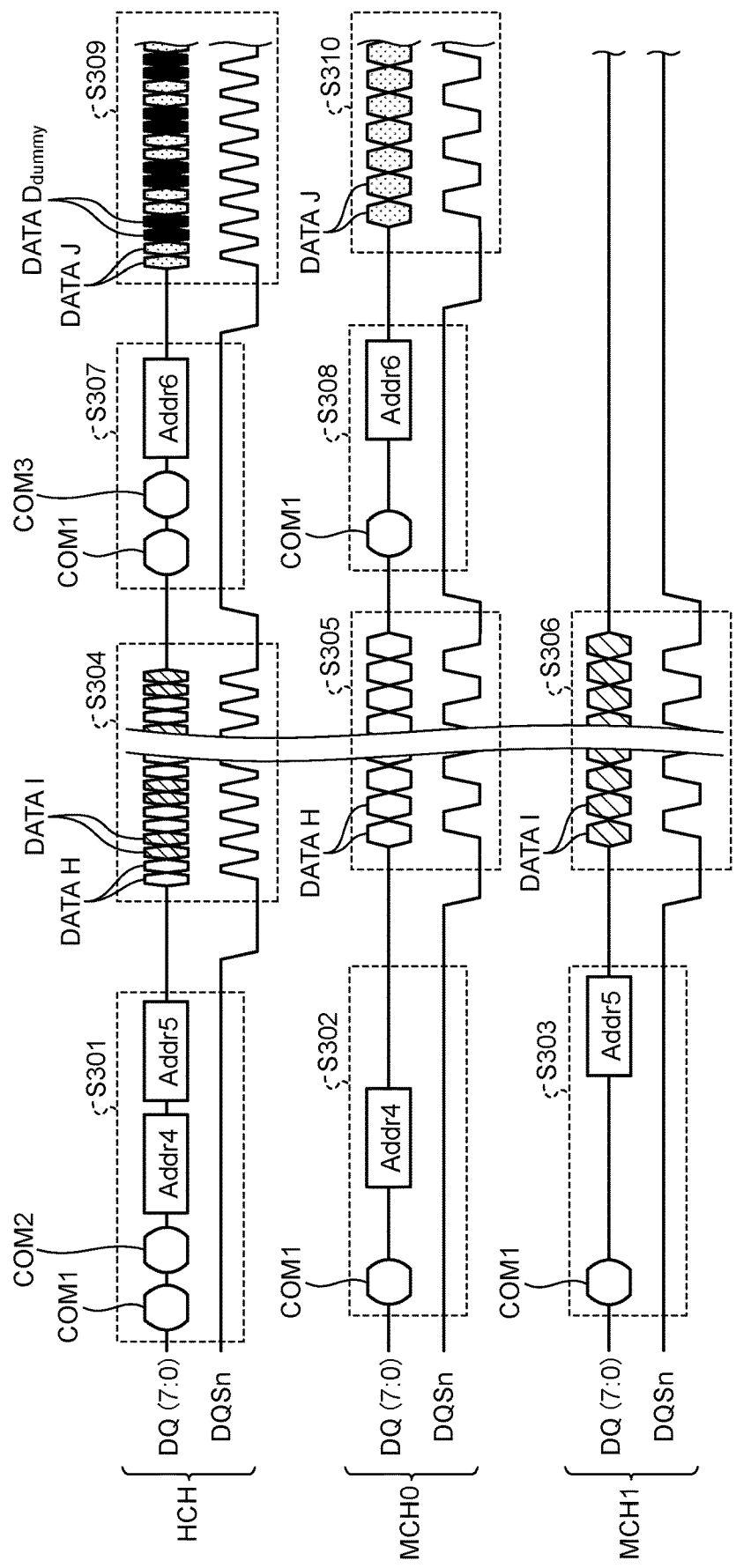
FIG. 14 is a timing chart for illustrating an example of a method of data transfer responsive to an unpaired access request according to the second embodiment.

FIG. 14 is a timing chart illustrating an example of a data transfer method related to an unpaired access request according to the second embodiment. FIG. 14 illustrates an example that an unpaired access request designating a write operation as an access type is executed after a pair of access requests designating a write operation as an access type is executed. FIG. 14 illustrates the waveforms of the data signal DQ(7:0) and the data strobe signal DQSn among the signals transferred through the host channel HCH, the memory channel MCH0, and the memory channel MCH1.

First, the memory controller MC transfers a write command COM1, a parallel transfer command COM2, a fourth address Addr4, and a fifth address Addr5 as the data signal DQ(7:0) to the bridge chip BC in this order via the host channel HCH (S301). The fourth address Addr4 indicates a location to be accessed in the memory chips CP0 connected to the memory channel MCH0. The fifth address Addr5 indicates a location to be accessed in the memory chips CP1 connected to the memory channel MCH1.

For the memory channel MCH0, the bridge chip BC masks the parallel transfer command COM2 and the fifth address Addr5 among the write command COM1, the parallel transfer command COM2, the fourth address Addr4, and the fifth address Addr5 and transfers the write command COM1 and the fourth address Addr4 thereto (S302). For the memory channel MCH1, the bridge chip BC masks the parallel transfer command COM2 and the fourth address Addr4 among the write command COM1, the parallel transfer command COM2, the fourth address Addr4, and the fifth address Addr5 and transfers the write command COM1 and the fifth address Addr5 thereto (S303).

After transferring the command sequence of the write command COM1, the parallel transfer command COM2, the fourth address Addr4, and the fifth address Addr5, the memory controller MC transfers a concatenation of data H addressed to the location indicated by the fourth address Addr4 (i.e., write destination) and data I addressed to the location indicated by the fifth address Addr5 (i.e., write destination) to the bridge chip BC (S304). Of the data transferred in S304, 1-byte data constituting the data H is represented by the open hexagon, and 1-byte data constituting the data I is represented by the hatched hexagon. To transfer the concatenation of the data H and the data I, the memory controller MC transfers the data signal DQ(7:0) and the data strobe signal DQSn at a frequency twice higher than the transfer frequency of the memory channel MCH.

The bridge chip BC splits the concatenation of the data H and the data I into the data H and the data I. The bridge chip BC then transfers the data H to the memory channel MCH0 (S305) and transfers the data I to the memory channel MCH1 (S306).

The memory controller MC executes an unpaired access request after transferring the concatenation of the data H and the data I. Herein, the unpaired access request is defined as a write request for writing data J to the memory chip CP0 connected to the memory channel MCH0, as an example.

The memory controller MC transfers the write command COM1, a dummy transfer command COM3, and a sixth address Addr6 as the data signal DQ(7:0) to the bridge chip BC in this order via the host channel HCH (S307). The dummy transfer command COM3 is a command for giving a notice of transfer of a concatenation of N (herein, two) pieces of data including the dummy data $D_{dummy}$. The sixth address Addr6 indicates a location where data among the N (herein, two) pieces of data before the concatenation except for the dummy data $D_{dummy}$ is to be written. In this example, the sixth address Addr6 indicates a location to be written in the memory chips CP0 connected to the memory channel MCH0. The dummy transfer command COM3 corresponds to the dummy access flag Cdm illustrated in FIG. 13.

The bridge chip BC masks the dummy transfer command COM3 among the write command COM1, the dummy transfer command COM3, and the sixth address Addr6, and transfers the write command COM1 and the sixth address Addr6 to the memory channel MCH0 (S308).

After transferring the write command COM1, the dummy transfer command COM3, and the sixth address Addr6, the memory controller MC transfers the concatenation of the data J and the dummy data $D_{dummy}$ to the bridge chip BC (S309). Of the data transferred in S309, 1-byte data constituting the data J is represented by the dot-hatched hexagon, and 1-byte data constituting the dummy data $D_{dummy}$ is represented by the solid hexagon. In S309, to transfer the concatenation of the data J and the dummy data $D_{dummy}$, the memory controller MC transfers the data signal DQ(7:0) and the data strobe signal DQSn at a frequency twice higher than the transfer frequency of the memory channel MCH.

The bridge chip BC splits the concatenation of the data J and the dummy data $D_{dummy}$ into the data J and the dummy data $D_{dummy}$. The bridge chip BC then transfers the data J to the memory channel MCH0 (S310). The bridge chip BC discards the dummy data $D_{dummy}$.

Figure 15:
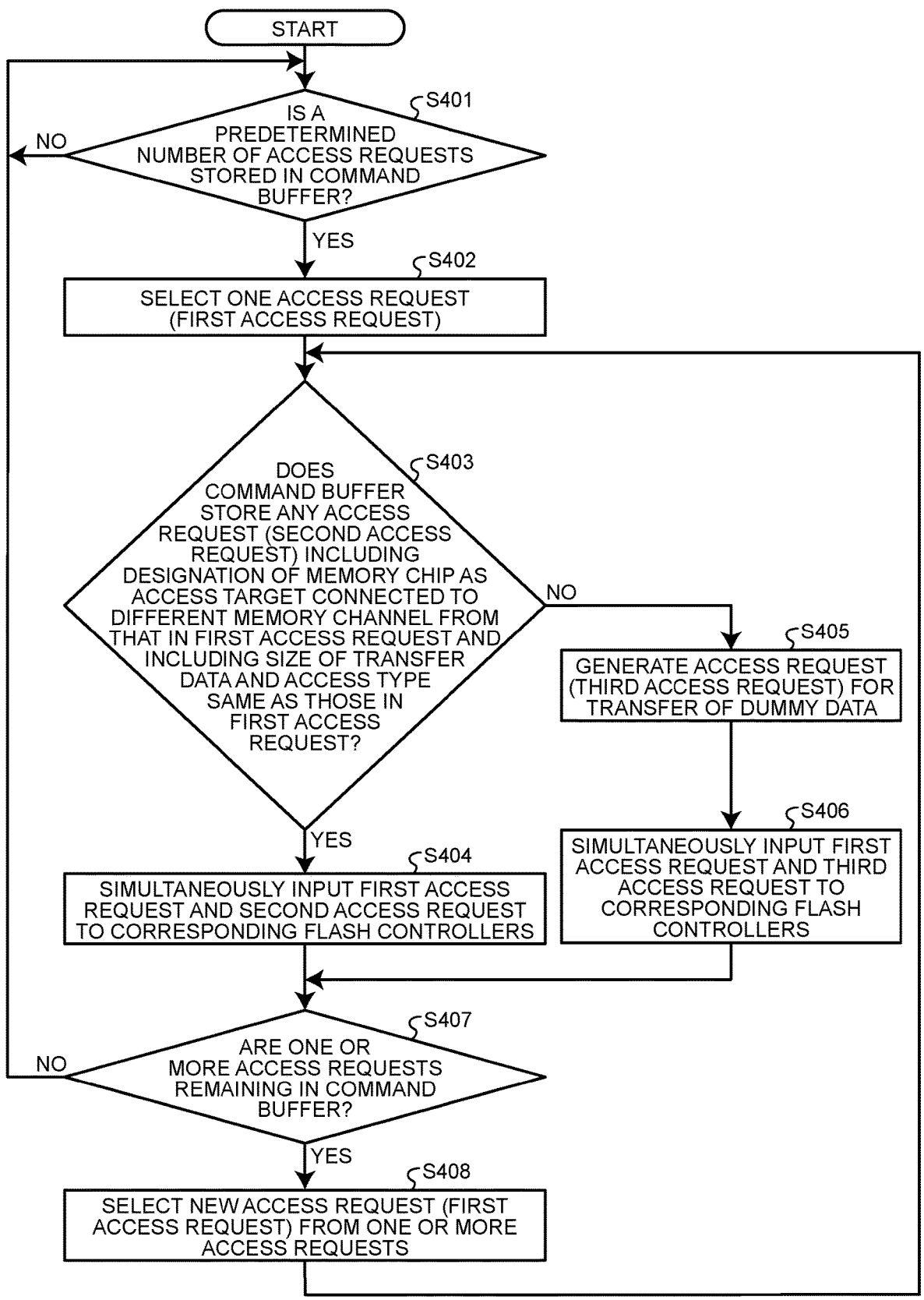
FIG. 15 is a flowchart illustrating an example of a scheduler operation according to the second embodiment.

FIG. 15 is a flowchart illustrating an exemplary operation of the scheduler 12 according to the second embodiment. FIG. 15 omits illustrating the operation of storing an access request in the command buffer 120. As an example, an access request is issued by the CPU 11 and then stored in the command buffer 120 asynchronously with the series of operations illustrated in FIG. 15.

First, the processor 122 determines whether the command buffer 120 stores a predetermined number of access requests (S401). The predetermined number may be set to one or two or more.

When the number of access requests stored in the command buffer 120 is less than the predetermined number (S401: No), the processor 122 performs the determination of S401 again to postpone the next operation until the number of access requests stored in the command buffer 120 reaches the predetermined number.

When the predetermined number of access requests is stored in the command buffer 120 (S401: Yes), the processor 122 selects one of the predetermined number of access requests stored in the command buffer 120 (S402). For example, the processor 122 selects the access request having been stored in the command buffer 120 at the earliest timing. The access-request selecting method is not limited to this example. The access request selected in the process of S402 is referred to as a first access request.

Subsequently, the processor 122 determines whether the command buffer 120 stores an access request including a designation of the memory chip CP as the access target connected to a different memory channel MCH from that in the first access request and including a size of transfer data and an access type same as those in the first access request (S203). Such an access request related to a different one of the memory channels MCH from that in the first access request and the same transfer-data size and access type as those in the first access request is referred to as a second access request.

When the second access request is stored in the command buffer 120 (S403: Yes), the processor 122 concurrently inputs the first access request and the second access request to the first flash controller 14-0 and the second flash controller 14-1 corresponding to the memory channels MCH connected to the memory chips CP indicated as the access targets (S404).

When the second access request is not stored in the command buffer 120 (S403: No), the processor 122 generates an access request for transfer of dummy data $D_{dummy}$ (S405). The access request for transfer of dummy data $D_{dummy}$ is referred to as a third access request. The processor 122 generates the third access request such that the third access request includes the same type of access and transfer-data size as the first access request and a designation of the memory chip CP as an access target connected to a different memory channel MCH from the memory channel in the first access request.

The processor 122 concurrently inputs the first access request and the third access request to either the first flash controller 14-0 and the second flash controller 14-1 corresponding to the memory channels MCH connected to the memory chips CP indicated as the access targets (S406).

After S404 or S406, the processor 122 determines whether one or more other access requests are stored in the command buffer 120 (S407). When one or more access requests are remaining in the command buffer 120 (S407: Yes), the processor 122 selects a new access request from the one or more access requests in the command buffer 120 (S408). The processor 122 repeats the processing from S403 with respect to the access request selected in S408, i.e., the first access request.

With one or more access requests not remaining in the command buffer 120 (S407: No), the processor 122 repeats the processing from S401.

In this example, when the first access request corresponds to an unpaired access request, that is, when the determination of S403 results in No, the processor 122 immediately generates the third access request. The processing involving the unpaired, first access request is not limited to this example.

For example, when the first access request is an unpaired access request, the processor 122 postpones the processing of S405 for a predetermined time. If the first access request is still unpaired after the predetermined time elapses, the processor 122 may proceed to the processing of S405. If a new second access request is stored in the command buffer 120 before elapse of the predetermined time, the processor 122 may proceed to the processing of S405. While postponing the processing of S405, the processor 122 may select a new access request as the first access request to execute the processing from S403.

The above description includes an example that the single semiconductor memory device 1 is connected to the memory controller MCa via the single host channel HCH. As with the first embodiment, the techniques of the second embodiment are applicable to a memory system including multiple semiconductor memory devices 1.

Further, the above description includes an example that the semiconductor memory device 1 includes two memory channels MCH. The semiconductor memory device 1 may include three or more memory channels MCH, and one or more memory chips CP may be connected to each of the memory channels MCH.

For example, to be able to control the semiconductor memory device 1 including N (N is an integer of 2 or more) memory channels MCH and one or more memory chips CP connected to each of the memory channels MCH, the memory controller MC is provided with N or more than N flash controllers 14 for one host channel HCH. The scheduler 12 sequentially acquires, from among the access requests stored in the command buffer 120, a set of N access requests designating as access targets the memory chips CP connected to the mutually different memory channels MCH. The scheduler 12 individually inputs the access requests of the acquired set to the N corresponding flash controllers 14. The N flash controllers 14 perform data transfers in parallel responsive to the input access requests.

When the number of access requests as access targets designating the memory chips CP connected to the different memory channels MCH matches M (M is an integer of 1 or more and less than N), the scheduler 12 generates (N-M) third access requests for transfer of the dummy data $D_{dummy}$. The N flash controllers 14 execute the M access requests and the (N-M) third access requests in parallel.

As described above, according to the second embodiment, when in the command buffer 120 the number of access requests designating as access targets the memory chips CP connected to the different memory channels MCH is less than N, the memory controller MCa generates one or more third access requests for transfer of the dummy data $D_{dummy}$ and executes the N access requests including the one or more third access requests for transfer of the dummy data $D_{dummy}$ in parallel.

Thus, it is made possible to constantly maintain the host channel HCH at the transfer rate N times higher than the transfer rate of the memory channel MCH. This eliminates the necessity to switch the transfer rate of the host channel HCH, further improving the data transfer efficiency between the memory controller MCa and the semiconductor memory device 1.

When the N access requests including one or more third access requests for transfer of the dummy data $D_{dummy}$ are write requests, the bridge chip BC receives a concatenation of the N pieces of data including the dummy data $D_{dummy}$ via the host channel HCH. In other words, the bridge chip BC receives the N pieces of data in parallel via the host channel HCH. Among the received N pieces of data, the bridge chip BC discards the dummy data $D_{dummy}$ and transfers the remaining pieces of data to the corresponding memory chips CP designated as access targets. When the N access requests including the one or more third access requests for transfer of the dummy data $D_{dummy}$ are read requests, the bridge chip BC acquires, from the designated memory chips CP, read data requested by the individual access requests among the N access requests except for the one or more third access requests for transfer of the dummy data $D_{dummy}$. The bridge chip BC then generates one or more pieces of dummy data $D_{dummy}$ responsive to the one or more third access requests, concatenates the read data and the one or more pieces of dummy data $D_{dummy}$, and transmits the concatenated data to the memory controller MCa.

While certain embodiments have been described, these embodiments have been presented by way of example only, and are not intended to limit the scope of the inventions. Indeed, the novel methods and systems described herein may be embodied in different other forms; furthermore, various omissions, substitutions and varies in the form of the methods and systems described herein may be made without departing from the spirit of the inventions. The accompanying claims and their equivalents are intended to cover such forms or modifications as would fall within the scope and spirit of the inventions.

What is claimed is:

1. A memory system comprising:
a semiconductor memory device comprising
a first circuit,
a plurality of second circuits each including a memory cell array,
a first number of first channels connected to the first circuit, each of which is connected to one or more of the plurality of second circuits, the first number being two or more; and
a control circuit connected to the semiconductor memory device via a second channel, the control circuit configured to:
generate a plurality of first access requests each for requesting a data transfer with a designation of one of the plurality of second circuits as an access target,
determine an order of execution of the plurality of first access requests to allow concurrent execution of a second number of first access requests designating as access targets two or more of the plurality of second circuits connected to different first channels of the first number of first channels, the second number being an integer of one or more and the first number or less, and
execute in parallel the second number of data transfers responsive to the second number of first access requests via the second channel at a transfer rate the second number of times a transfer rate of one of the first number of first channels, wherein
the control circuit is further configured to:
when the number of the first access requests designating the second circuits connected to the different first channels as access targets is less than the second number,
generate one or more second access requests for requesting transfer of dummy data, and
execute in parallel the second number of third access requests including one or more of the plurality of first access requests and the one or more second access requests.

2. The memory system according to claim 1, wherein the control circuit is further configured to:
sequentially identify, from among the plurality of first access requests, one or more sets of the second number of first access requests designating as access targets the second circuits connected to the different first channels, and
execute in parallel the second number of first access requests included in each of the one or more sets as identified.

3. The memory system according to claim 1, wherein the first circuit is configured to: when each of the second number of third access requests is a write request, receive the second number of pieces of first data via the second channel, discard the dummy data in the second number of pieces of first data, and individually transfer one or more remaining pieces of first data to one or more of the plurality of second circuits designated as access targets by one or more corresponding first access requests of the one or more first access requests, and when each of the third access requests of the second number is a read request, acquire one or more pieces of second data from the one or more second circuits designated as access targets by the one or more first access requests, generate one or more pieces of dummy data responsive to the one or more second access requests, and transmit the one or more pieces of second data and the one or more pieces of dummy data to the control circuit via the second channel.

4. The memory system according to claim 1, wherein the control circuit is further configured to:
when the number of the first access requests designating the second circuits connected to the different first channels as access targets is less than the second number,
change the transfer rate of the second channel from the second number of times the transfer rate of the one of the first number of first channels to a third number of times the transfer rate of the one of the first number of first channels, the third number being smaller than the first number, and
execute in parallel the third number of data transfers responsive to the third number of first access requests designating as access targets the second circuits connected to the different first channels.

5. The memory system according to claim 1, wherein each of the plurality of second circuits is NAND flash memory.

6. A control method of a semiconductor memory device comprising a first circuit, a plurality of second circuits each including a memory cell array, a first number of first channels connected to the first circuit, each of which is connected to one or more of the plurality of second circuits, the first number being two or more, the method comprising:
generating a plurality of first access requests each for requesting a data transfer with a designation of one of the plurality of second circuits as an access target;
determining an order of execution of the plurality of first access requests to allow concurrent execution of a second number of first access requests designating as access targets two or more of the plurality of second circuits connected to different first channels of the first number of first channels, the second number being an integer of one or more and the first number or less; and
executing in parallel the second number of data transfers responsive to the second number of first access requests via the second channel at a transfer rate the second number of times a transfer rate of one of the first number of first channels, wherein
the control method further comprising:
when the number of the first access requests designating the second circuits connected to the different first channels as access targets is less than the second number, generating one or more second access requests for requesting transfer of dummy data, and executing in parallel the second number of third access requests including one or more of the plurality of first access requests and the one or more second access requests.

7. The method according to claim 6, further comprising:
sequentially identifying, from among the plurality of first access requests, one or more sets of the second number of first access requests designating as access targets the second circuits connected to the different first channels, and executing in parallel the second number of first access requests included in each of the one or more sets as identified.

8. The method according to claim 6, wherein when each of the second number of third access requests is a write request, the first circuit receives the second number of pieces of first data via the second channel, discards the dummy data in the second number of pieces of first data, and individually transfers one or more remaining pieces of first data to one or more of the plurality of second circuits designated as access targets by one or more corresponding first access requests of the one or more first access requests, and when each of the third access requests of the second number is a read request, the first circuit acquires one or more pieces of second data from the one or more second circuits designated as access targets by the one or more first access requests, generates one or more pieces of dummy data responsive to the one or more second access requests, and transmits the one or more pieces of second data and the one or more pieces of dummy data to the control circuit via the second channel.

9. The method according to claim 6, further comprising:
when the number of the first access requests designating the second circuits connected to the different first channels as access targets is less than the second number, changing the transfer rate of the second channel from the second number of times the transfer rate of the one of the first number of first channels to a third number of times the transfer rate of the one of the first number of first channels, the third number being smaller than the first number, and executing in parallel the third number of data transfers responsive to the third number of first access requests designating the second circuits connected to the different first channels as access targets.

10. The method according to claim 6, wherein each of the plurality of second circuits is NAND flash memory.

11. A control circuit being connectable to a semiconductor memory device which comprises a first circuit, a plurality of second circuits each including a memory cell array, a first number of first channels connected to the first circuit, each of which is connected to one or more of the plurality of second circuits, the first number being two or more, the control circuit being connected to the semiconductor memory device via a second channel, and configured to:

generate a plurality of first access requests each for requesting a data transfer with a designation of one of the plurality of second circuits as an access target, determine an order of execution of the plurality of first access requests to allow concurrent execution of a second number of first access requests designating as access targets two or more of the plurality of second circuits connected to different first channels of the first number of first channels, the second number being an integer of one or more and the first number or less, and execute in parallel the second number of data transfers responsive to the second number of first access requests via the second channel at a transfer rate the second number of times a transfer rate of one of the first number of first channels, wherein the control circuit is further configured to:
when the number of the first access requests designating the second circuits connected to the different first channels as access targets is less than the second number, generate one or more second access requests for requesting transfer of dummy data, and execute in parallel the second number of third access requests including one or more of the plurality of first access requests and the one or more second access requests.

12. The control circuit according to claim 11, wherein the control circuit is further configured to:

sequentially identify, from among the plurality of first access requests, one or more sets of the second number of first access requests designating as access targets the second circuits connected to the different first channels, and execute in parallel the second number of first access requests included in each of the one or more sets as identified.

13. The control circuit according to claim 11, wherein when each of the second number of third access requests is a write request, the first circuit receives the second number of pieces of first data via the second channel, discards the dummy data in the second number of pieces of first data, and individually transfers one or more remaining pieces of first data to one or more of the plurality of second circuits designated as access targets by one or more corresponding first access requests of the one or more first access requests, and when each of the third access requests of the second number is a read request, the first circuit acquires one or more pieces of second data from the one or more second circuits designated as access targets by the one or more first access requests, generates one or more pieces of dummy data responsive to the one or more second access requests, and transmits the one or more pieces of second data and the one or more pieces of dummy data to the control circuit via the second channel.

14. The control circuit according to claim 11, wherein the control circuit is further configured to:

when the number of the first access requests designating the second circuits connected to the different first channels as access targets is less than the second number, change the transfer rate of the second channel from the second number of times the transfer rate of the one of the first number of first channels to a third number of times the transfer rate of the one of the first number of first channels, the third number being smaller than the first number, and execute in parallel the third number of data transfers responsive to the third number of first access requests designating the second circuits connected to the different first channels as access targets.

15. The control circuit according to claim 11, wherein each of the plurality of second circuits is NAND flash memory.

* * * * *